(12) United States Patent (10) Patent No.: US 7,398,261 B2
Spivack et al. (45) Date of Patent: Jul. 8, 2008

(54) METHOD AND SYSTEM FOR MANAGING AND TRACKING SEMANTIC OBJECTS

(75) Inventors: Nova Spivack, San Francisco, CA (US); Kristinn R. Thorisson, Reykjavik (IS)

(73) Assignee: Radar Networks, Inc., San Francisco, CA (US)

( * ) Notice: Subject to any disclaimer, the term of this patent is extended or adjusted under 35 U.S.C. 154(b) by 531 days.

(21) Appl. No.: 10/719,652

(22) Filed: Nov. 20, 2003

(65) Prior Publication Data
US 2004/0220893 A1 Nov. 4, 2004

Related U.S. Application Data

(60) Provisional application No. 60/427,550, filed on Nov. 20, 2002.

(51) Int. Cl.
*G06N 5/00* (2006.01)
(52) U.S. Cl. .............................. 706/55; 707/10; 709/225
(58) Field of Classification Search .................. 706/45, 706/55; 707/10; 709/225
See application file for complete search history.

(56) References Cited

U.S. PATENT DOCUMENTS

| 6,643,650 | B1 * | 11/2003 | Slaughter et al. .............. 707/10 |
| 6,789,077 | B1 * | 9/2004 | Slaughter et al. .............. 707/10 |
| 6,868,447 | B1 * | 3/2005 | Slaughter et al. ............ 709/225 |

* cited by examiner

*Primary Examiner*—Wilbert L Starks, Jr.
(74) *Attorney, Agent, or Firm*—Perkins Coie, LLP

(57) ABSTRACT

Methods and systems for managing and tracking semantic objects are disclosed herein. In one aspect, embodiments of the present disclosure include a method, which may be implemented on a system of, managing a semantic collection. One embodiment can include, receiving a request to create the semantic collection comprising a set of semantic objects, creating a semantic link between the set of semantic objects via updating metadata associated with the set of semantic objects, and identifying a set of rules to be associated with the semantic collection. In one embodiment, the metadata associated with the set of semantic objects is undated based on the set of rules. In a further aspect, embodiments of the present disclosure include a method of tracking a semantic object.

21 Claims, 31 Drawing Sheets

METHOD AND SYSTEM FOR MANAGING AND TRACKING SEMANTIC OBJECTS

CROSS-REFERENCE TO RELATED APPLICATIONS

The present application claims priority under 35 USC § 119 to Provisional Patent 60/427,550 filed on Nov. 20, 2002, titled Semantic Network Platform, Framework and Application, incorporated herein for all purposes.

BACKGROUND OF THE INVENTION

1. Field of the Invention

The present invention relates generally to computer software and network applications. More specifically, it relates to software for implementing knowledge management systems and knowledge representation.

2. Discussion of Related Art

Knowledge workers, teams and organizations routinely work with a large and complex array of information. This includes e-mail messages, instant messages, chats, discussion postings, calendars, contact and to-do lists, documents, photos, maps, and database records. This information also includes tacit knowledge and expertise that resides only in people's heads. The average knowledge worker interacts with several dozen information types, hundreds of Web sites, and dozens of different applications. Existing information systems are focused mainly on data, rather than on relationships between data. There is a growing need to enable applications and users to see how various types of information are related across different information systems and locations. However, there is no tool for connecting, managing and sharing this information in a unified way.

The growth of the Internet, as well as the increasing amount of information it contains, are leading to serious problems for many computer users. In particular, they are leading to a problem referred to as "information overload" in which parties are overwhelmed by more information than they can effectively process, navigate, search, track, respond to, utilize, cope with, or manage given limited time and resources.

A related problem is "information complexity" in which, due to the sheer volume of information choices on the Internet, and its disassociated nature, is making it overly difficult to locate particular desired information when it is needed. Another related problem is "dis-integration" that arises due to incompatible or nonstandard information and services, which leads to software and service incompatibilities, as well as obstacles to processing and managing information effectively. Another problem is "spam" that arises when Internet participants receive unsolicited, unwanted, or irrelevant information from other parties on the Internet. An additional problem that is related to spam is "lack of targeting" which arises because information providers such as publishers, advertisers, and marketers are unable to effectively distribute their information to appropriate, interested parties, due to lack of information about the interests and policies of those parties.

Another related problem that is also related to spam is called "lack of personalization" which arises when parties on the Internet are unable to effectively subscribe to, filter or control the information they get from others. Another problem is "lack of privacy control" which results because Internet participants are unable to effectively control what information about themselves is shared with or by other parties on the Internet. Yet another drawback is "information deficit" that results when parties are unable to find, or do not receive, the information they need or are relevant to, even though it is available somewhere on the Internet or even on their own computers.

These problems, and related problems, are becoming serious obstacles to knowledge work, commerce, collaboration, publishing, marketing, advertising, search, communications and communities. In particular these problems are reducing the productivity of Internet participants. Parties must spend increasing amounts of time and resources searching for information they seek, trying to ensure that they receive information they want from others, trying to block or delete unwanted information received from others, responding to information they receive from others, managing and organizing information they want, tracking changes to information of interest to them, trying to distribute relevant information to others appropriately and trying not to mistakenly distribute unwanted or irrelevant information to others. With the expanding and pervasive use of the Internet and its increasingly central role in relationships, interactions and transactions of all kinds, those entities that provide content and/or Internet software tools and services are searching for and implementing ways to solve the above problems. However, attempts to solve these problems face numerous obstacles. Presently the Internet is comprised of many separate infrastructures and software tools that are used for different modes of communication. For example, e-mail communication takes place via e-mail servers and client software applications that communicate via specialized e-mail messaging protocols, yet Web searching for example takes place using search engines and databases that are accessed via Web browser software and Web transaction protocols. Thus, even if one were to solve the problem of information overload for e-mail it would not necessarily solve this same problem for Web searching.

A principal problem stems from present systems' inability to store, route and use meta-data about the data resources that they manipulate. It is therefore a goal of the present invention to provide a comprehensive solution to these limitations, in the areas of information overload, search, sharing, collaboration, communication, transactions, knowledge management, information distribution, and automated and manual manipulation of computer-stored data and resources, allowing information to be connected in meaningful ways.

Using traditional search systems, parties seeking something enter queries that are tested against databases of information that are provided by one or more parties with things to offer. If matches are found, the seekers are notified with links to the appropriate provider. One problem with such systems, however, is that they do not work in reverse; there is no way for providers to locate seekers who want what they offer. Instead, providers must wait passively to be found by seekers. Seekers on the other hand, must do all the work. Another problem is that it offers only search by keyword; there are no mechanisms that support higher-level organization of the information.

Providers who want to be found may resort to marketing in order to reach seekers. For example, many search engines provide an option to buy keyword advertising, enabling providers to market what they offer to seekers who enter relevant queries. Although they do this, they do not enable providers to search for seekers who want what they offer, nor do they help them locate seekers who are not presently searching but are still interested. Thus providers must use external marketing channels such as direct email, banner advertising, paper-based direct mail and other forms of advertising to locate interested seekers. These inefficiencies result in increased transaction costs for seekers and for providers.

The present invention provides a single universal underlying infrastructure for managing information overload, distributing, locating and filtering information between information providers and recipients that works equally well across all types of Internet relationships, interactions and transactions. This single solution can be used to route and filter e-mail and instant messages, search the Internet, share files, publish and subscribe to information, market and advertise, coordinate and collaborate with others, personalize services, engage in online communities, and improve the efficiency of on-line commerce between buyers, sellers and intermediaries.

SUMMARY OF THE INVENTION

In one aspect of the invention, a semcard management application described herein represents a reference-implementation has a user interface that consists of several panels that facilitate the use of semcards, the objects they represent, and the knowledge network. These panels include an entry point panel, a filter panel, a results panel, and a viewer. One category of entry points is referred to as "context" entry points. Contexts allow semcards to be organized into hierarchically arranged categories. A context is a grouping or category of semcards meeting one or more sets of criteria; the grouping is constructed automatically or manually, or as a combination of both. After the user has created a context, this context can be used as an entry point to a set of semcards meeting a certain criteria.

Another way a user can select semcards meeting certain criteria, in combination with entry points or when no specific entry points are available, is to use a filtering mechanism. This allows a user to quickly select a subset of semcards or a single semcard in an ad hoc manner. Filtering is based on a collection of filter panels and system rules. Filters allow a user to select semcards based on their semantic dimensions, meta-data (or content), and other features. Filters are input-output devices where the input is a collection of semcards or other collection of elements with semantic dimensions, and the output is typically a subset of the input. Rules and ontologies determine which features can be used for each filter panel that appears in the user interface. Filter panels can be displayed in the user interface in a non-stacked or overlaying configuration or in a stacked configuration. Other configurations are also possible, such as tree-structures, separate windows, and graph structures.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defamed by the appended claims.

The present invention presents a comprehensive system for augmenting computer-mediated collaboration and communication of knowledge and information, using the concept of semcards, that can be interconnected via a particular type of semcard that functions as a semantic link, to form distributed knowledge networks.

A semcard is a semantic software object that contains slots with semantic tags, and content, all of which can be represented semantically, optionally using an ontology, and rules embodying optional rules regarding automation, goals, display, access permissions and other policies, sharing, and other operations of the semcard and its target referent. The target referent is what the semcard is about: it is an entity or concept that the semcard represents or describes and holds metadata about. It can be a physical entity such as a living person, a software entity such as a data record or word processing document, or an intangible entity such as an idea or thought or feeling. Any type of digital object or information can be attached to a semcard, e.g. a digital certificate, a link to a web page or a product or service offer, an SKU, a data record in a database, or knowledge item, software, or a file or media object, media streams, a link to a remote Web service, etc. Semcards can also be used themselves to represent the relationship between other semcards, for example, that the person is the author of the idea.

A semcard can be thought of as a form with fields or slots, and has two incarnations, template and instance, which correspond roughly to the object-oriented programming concepts of object template and object instance.

Figure 1:
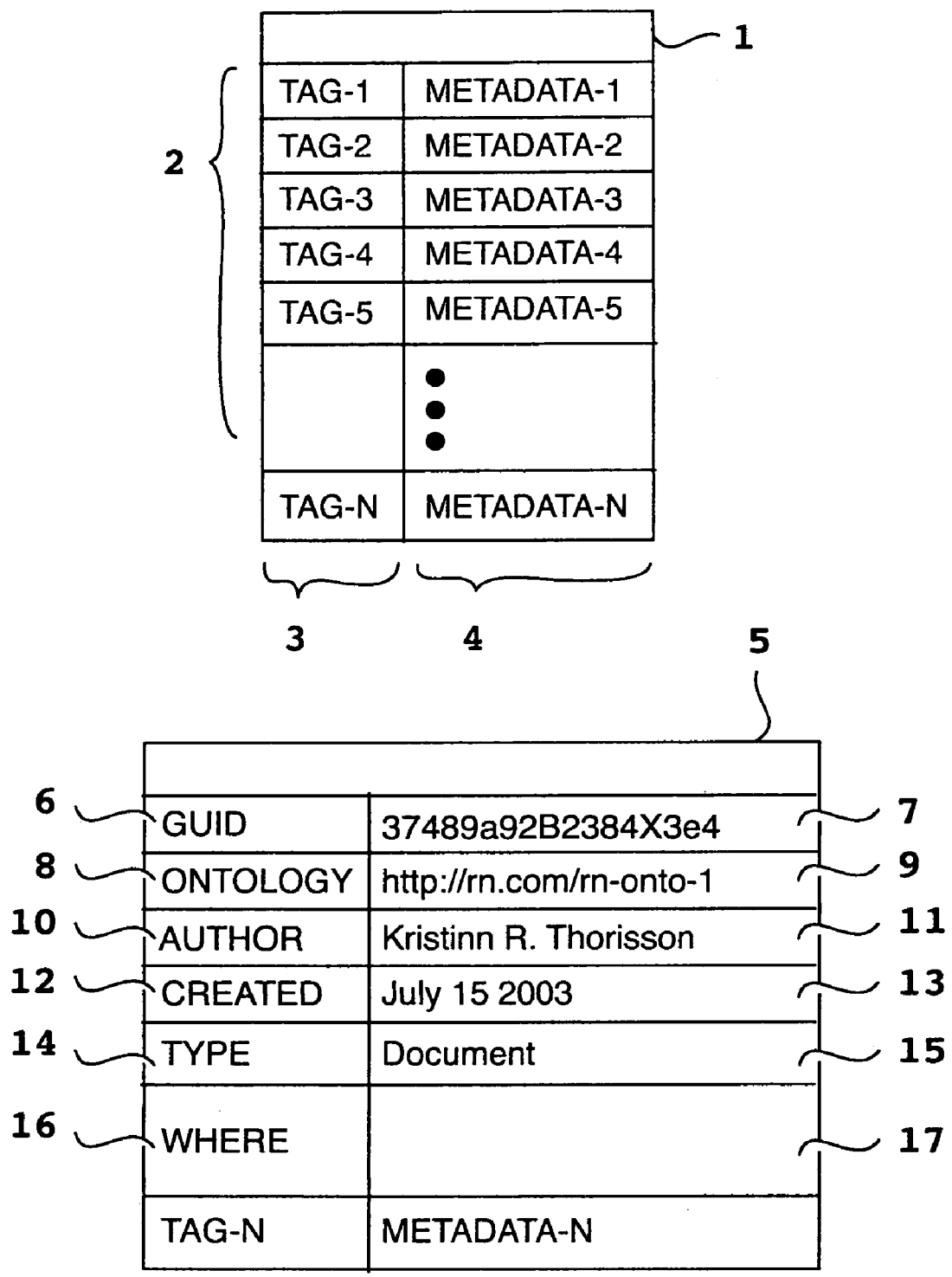
FIG. 1 is a block diagram of the basic semcard structure and an example of a semcard containing sample meta-data.
Figure 2:
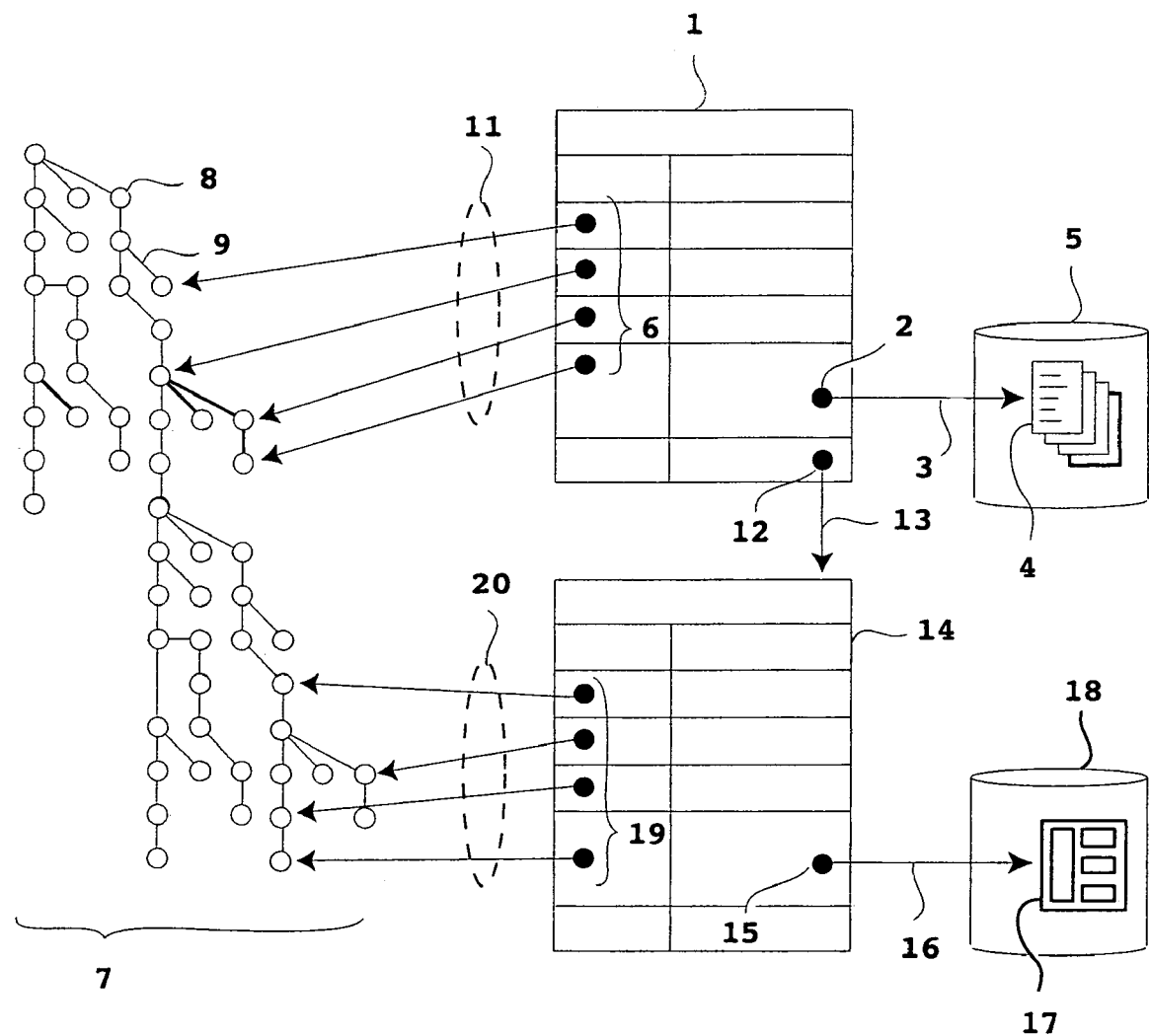
FIG. 2 is a block diagram showing relationships among a semcard, a sample referenced semcard, computer-readable data pointed to by the semcards, and an ontology.

As shown in further detail in FIGS. 1 and 2, each semcard has numerous semantic dimensions, also referred to as metatags in the semcard template. For example, for a semcard representing a material object, a semantic dimension (metatag) can be "color", which contains a particular value (metadata), and restrictions on what kind that value may be. (Semcards are also used to represent the semcard templates themselves.) To fill out a semcard, an instance is made of a semcard's template, and selected slots of the instance are filled with values. Each semcard instance, its semantic dimensions, and their values for each semcard, can be stored on a computer readable medium as an XML (extensible Markup Language) object, using the RDF (Resource Description Framework) format, any binary storage format, or other chosen format. Semcard templates can be created by designers, who hand-pick the meta-tags that define the semcard's referent target. Semcards can also be created dynamically and automatically through automated selection and organization of meta-tags from a pool of metatags; the selection of meta-tags and their organization in the semcard being driven by heuristic rules, e.g. by the meta-tags' popularity with a group of semcard users and authors.

Referring to FIG. 1, a semcard 1 contains rows, called slots, 2 for storing metatag-metadata pairs, tags on the left side 3, metadata on the right-hand side 4. A semcard 2 with example tags 6, 8, 10, 12, 14, 16 and example values for each tag 7, 9, 11, 13, 15. Slot 17 would hold a reference to a link semcard, as explained further below and in FIG. 6. In a preferred embodiment of the present invention, semcards are defined in XML that can be easily transformed to/from other data formats, including other XML formats, HTML, RSS, RDF, SHOE, DAML+OIL and OWL, as well as other application specific data formats. For the purposes of the present invention, the size and complexity of a semcard can vary. A collection of semcards linked together is referred to as a knowledge network. In a preferred embodiment, people can access and manipulate individual semcards, and knowledge networks, via desktop tools, as well as with standard Web browsers.

Figure 3:
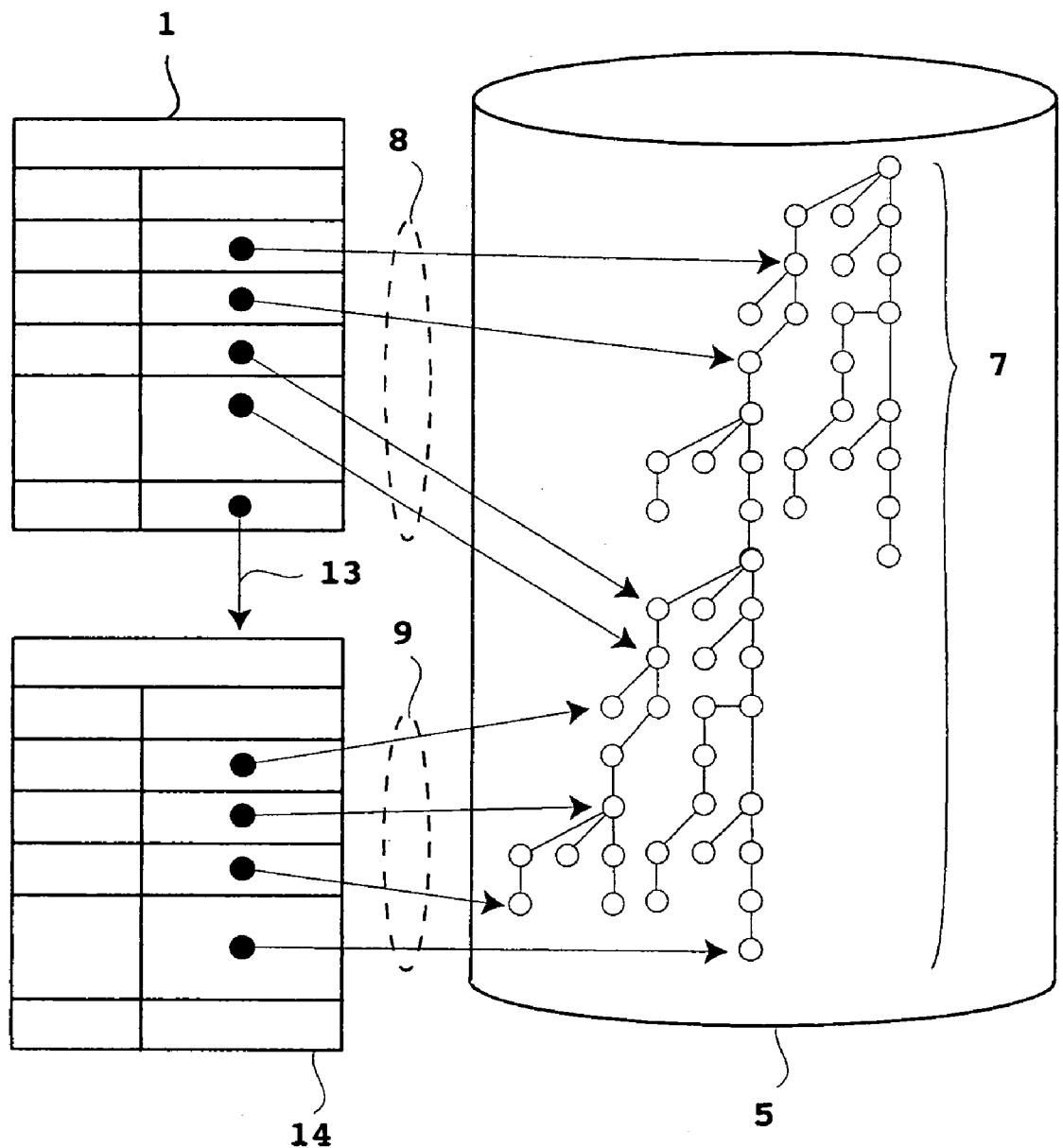
FIG. 3 is block diagram showing another example of a primary semcard referencing a second semcard both of which reference the same ontology.
Figure 6:
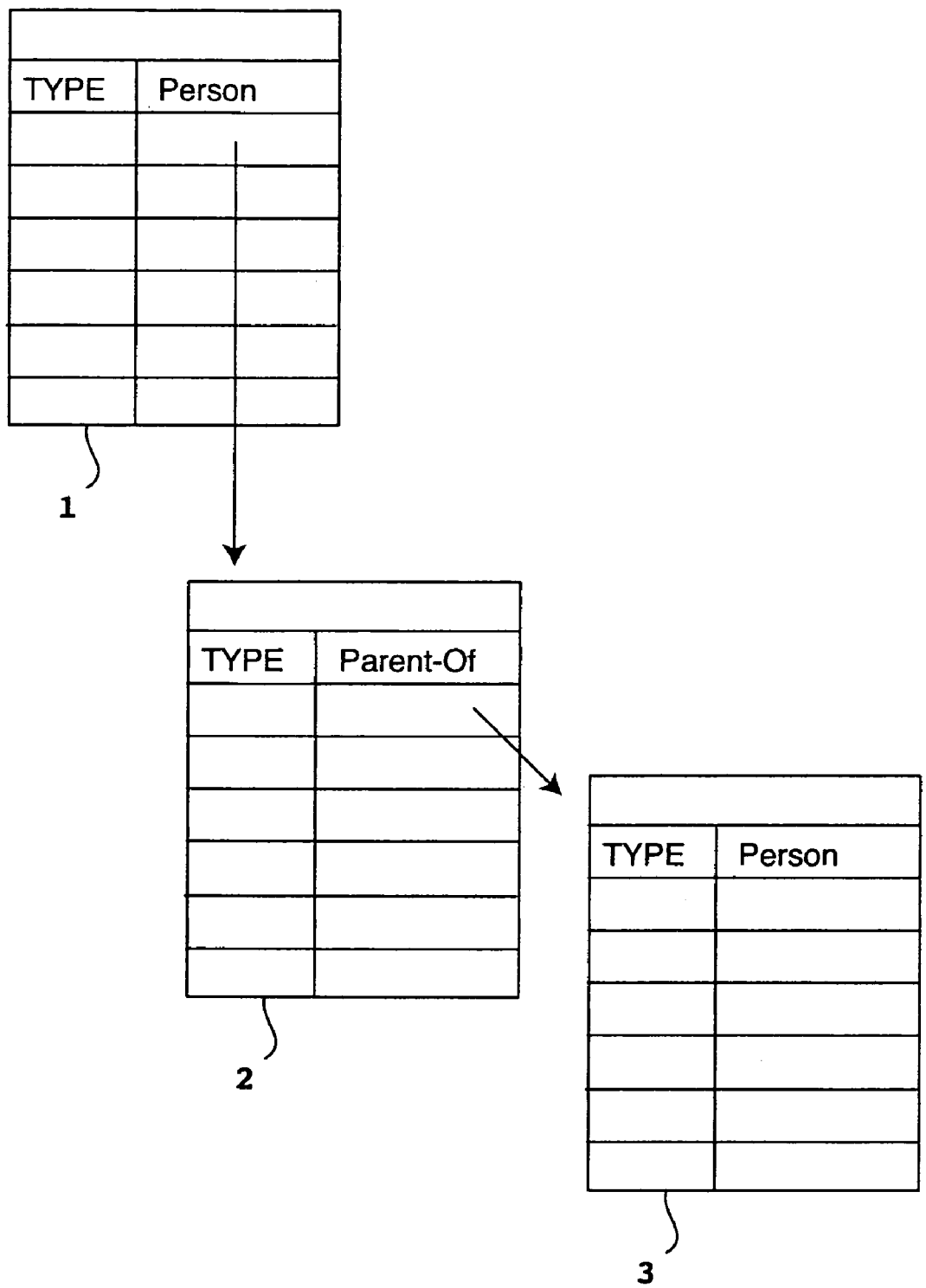
FIG. 6 is a block diagram showing two semcards connected by a link semcard defining a relationship between the two semcards.

Referring to FIG. 2, a semcard 1 contains data 2 which references 3 to an external entity 4, stored on a computer-readable medium 5(The link 3 to the external entity 4 is itself a semcard, as shown in FIG. 6.) The semcard's 1 tags 6 are defined 11 in an external ontology 7, which has standard nodes 8 and relationships between them 9. The semcard 1 contains data 12 which references a display specification 14, said display specification containing data 15 referencing 16 an application 17, stored in a computer-readable medium 18, said application being used to view and manipulate the entity 4 referenced by the semcard 1. The display specification 14 containing tags 19 which are also defined 20 in ontology 7. This ontology can be the same or a different ontology that defines the tags for the semcard 1. (The link 16 to the external display instructions 17 is itself a semcard, as illustrated in FIG. 6.) Data in semcards can be defined using an ontology. An example is a data element like 'Dalmatian' as the data value for the tag 'breed'. Referring to FIG. 3, a semcard 1 contains a reference 13 to a display specification 14, and data elements which reference 8 nodes in an ontology 7, stored in a computer-readable medium 5, said ontology 7 containing nodes and links. Said display specification 14 containing data which also reference 9 nodes in an ontology 4. This way both the tags of a semcard and its data can be defined in an ontology, the benefits of which are an ability to compare two or more semcards created by separate users at different times.

Although the amount of metadata in a single semcard can be very small or extremely large, a semcard is intended to be of a convenient size from a cognitive standpoint, so as not to overload its user with too much information. For example, a semcard describing an automobile would have the typical "common sense" data about its color, type, seating, engine power, etc.; if more information was desired to be represented about the car's engine, a separate semcard could be created for this purpose, and linked to from the automobile semcard. This way the relationship between single semcards and collections of semcards—or knowledge networks—is kept at a cognitively manageble ratio.

Figure 4:
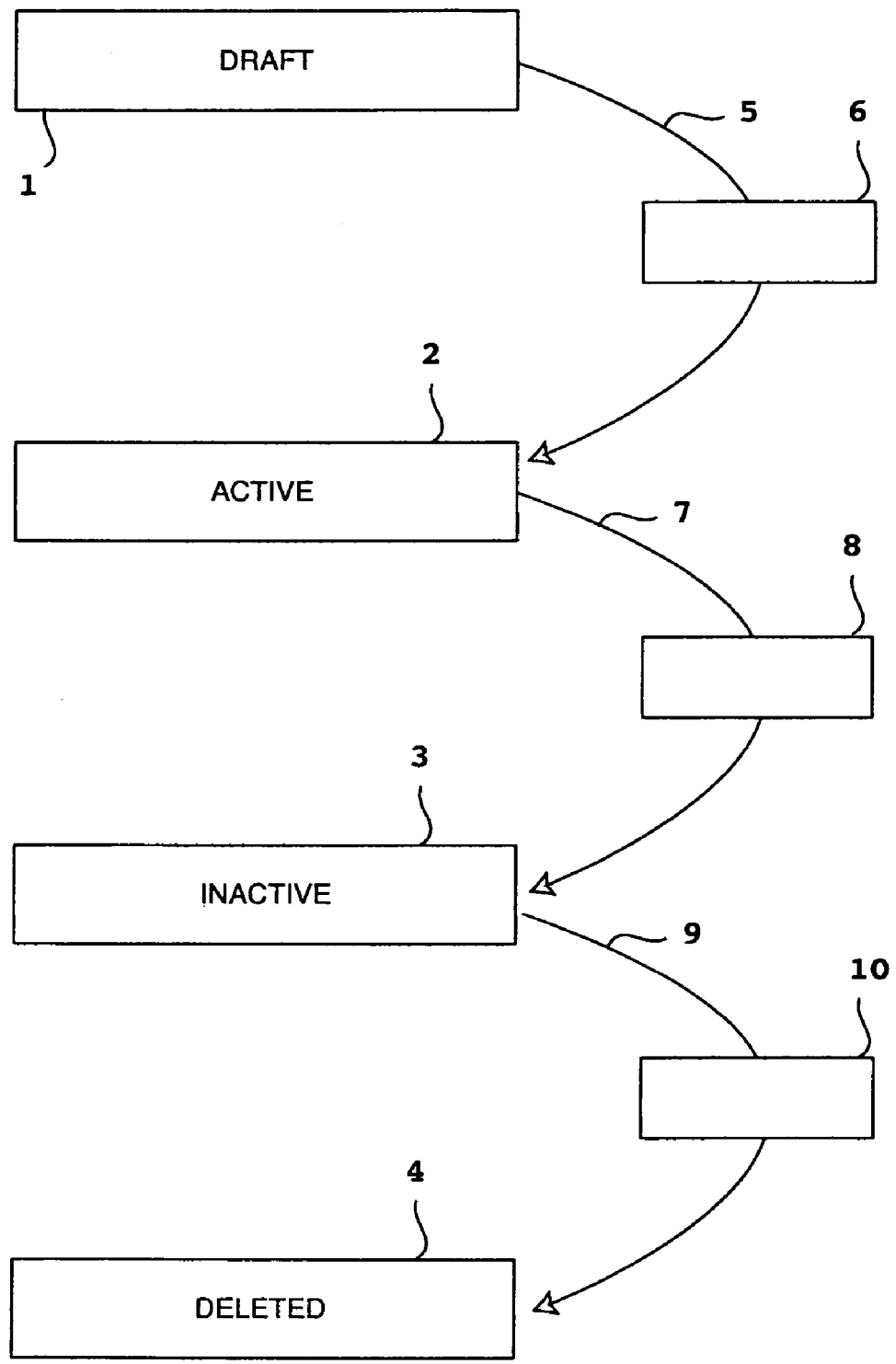
FIG. 4 is a block diagram showing the various lifecycle stages of a semcard.

In a preferred embodiment, part of the metadata of a semcard represents its lifecycle stages. There are four lifecycle stages of a semcard: (a) Draft, (b) active, (c) inactive, (d) deleted. FIG. 4 is a block diagram showing the lifecycle stages 1, 2, 3, 4 of a semcard. A semcard starts out in draft stage 1, and transitions from this sequentially through stages 5, 7, 9 based on events 6, 8, 10 which are initiated by the user or automatically initiated through rules codified in the semcard's policies or automation instructions or elsewhere, or by other means. The transition from draft 1 to active 2 happens through an activation event 6, which is initiated by the user, by automatic rules, or by other means. The transition from active 2 to inactive 3 happens through de-activation event 8, which is initiated by the semcard's maximum lifetime, by user-driven events, by automatic rules, or by other means. The transition from inactive 3 to deleted 4 happen through a deletion event 10, which is initiated by a user, by the Semcard Manager's determination that the semcard is no longer needed, by other automatic rules, or by other means.

Figure 5:
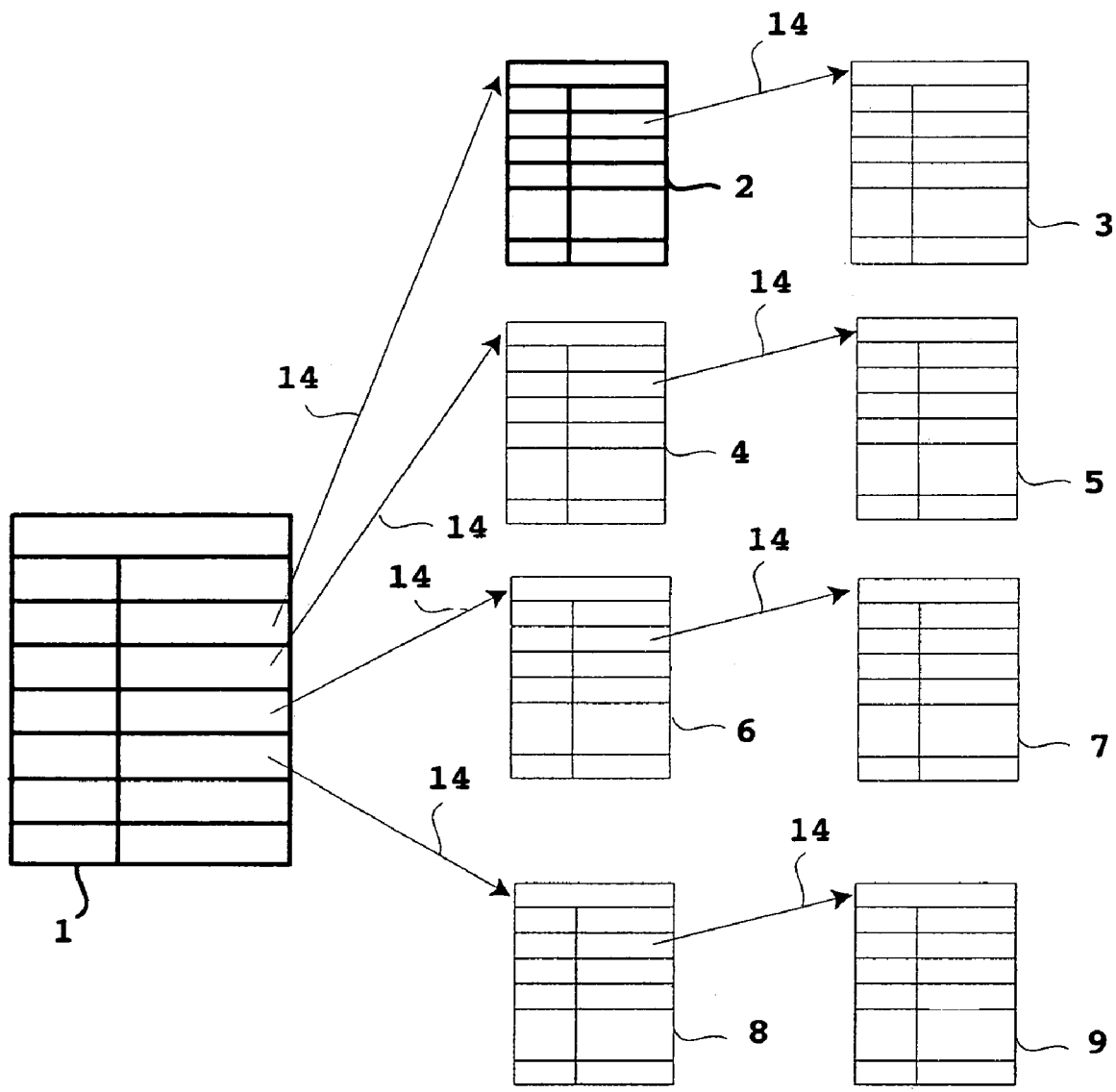
FIG. 5 is a block diagram showing numerous semcards and links comprising a knowledge network.

Referring to FIG. 5, a semcard 1 unifies information about a person, using pre-defined slots with pointers 14 to relevant information, including 20 their names 3, date of birth 5, contact information 7, addresses 9, friends 11, and authored document 13. Semcards 2, 4, 6, 8, 10, 12 relate each relevant semcard to the person semcard 1. In a preferred embodiment, slots on semcards can be defined to be required slots, i.e. belong to the object, and thus traveling with it when shared, published, copied, etc. In this example, the slots for a person's name and address are defined as required slots, and thus by default belong to the person semcard 1, whereas the 'Friend-Of' link is optional. When a semcard is shared, its optional slots require the owner of the object to explicitly designate them as shared; the required slots are shared by default when their parent object is shared. In the example of FIG. 5, if semcard 1 were to be shared, the semcards 10 and 11 would not be shared, by default—they would have to be specifically designated as shared.

Semcards are intended to represent a variety of common types of things, and templates for a variety of common things are provided by the semcard management application, including relationships, interactions and transactions including communications such as e-mail, instant messages, alerts, bids, announcements, questions, answers, invoices, receipts, proposals, search queries, invitations for participation in relationships and events and activities of various types, content, files, advertisements, brochures, catalogs, publications, subscriptions, opportunities, coupons, etc. In addition to these specific types of data and knowledge, semcards can also represent ideas, concepts, and other forms of tacit or intangible knowledge.

The following is a partial list of what semcards can be used to exchange and share: e-mail messages, instant messages, discussion threads and postings, chat messages, XML messages, directory listings, files, advertising and marketing, invitations, tasks, orders, invoices, receipts, information about auctions and bids, charges and payments, software and software updates, multimedia content, referrals for things, polls, surveys, reviews and opinions, data records, data streams, questions and answers, Web sites and Web pages, alerts and notifications, pop-up alerts, on-screen and audio notifications, information about events, information about opportunities, information about products and services, information about people, organizations and groups, information about topics, classified ads, publications and subscriptions, commands and reports, information about relationships, ontologies and ontology branches. Semcards can also be used to buy and sell things and other transactional tasks, to trade things, track interests and watch for events, filter information, publish information, subscribe to information, distribute information or digital products and services to targeted recipients, distribute information to fuzzy sets of recipients, interact anonymously, sell pay-per-view links to information, buy and sell semcards, transfer funds between parties based on transactions following from matchings between their semcards, brokering relationships and interactions between parties, send or receive semcards to/from parties who are indirectly related to a party by varying degrees of social distance (sequences of indirect relationships of varying number that connect the parties).

Semcards can be generated either manually by a user or automatically by the system. For example, user A finds a useful URL and creates a semcard for it. He includes his comments and description of the web page. The semcard gets metadata from the URL's web site automatically. User A links the semcard to projects and documents for the team user A stores the semcard in his semcard space. By doing so user A can be notified of changes to the site. He gives a copy of the semcard to user B who saves it all in his semcard space and adds his own data and comments, and attaches a file to it. The semcard that user A has is automatically updated to reflect user B's changes. It is synchronized with user B's copy and now gives user A access to user B's comments and the file that user B attached, which can stay on user B's semcard space on his peer or can be stored at another location.

Semcards can also be created fully automatically, for example, by data mining various resources on the Internet after those resources have been created. This can happen in advance of the semcards being needed or on-demand such as in response to queries.

Semcards can be created simultaneously with the creation of the content they will represent by including a semcard creation procedure within applications such that upon certain events they trigger semcard creation. Alternatively, semcards can be created via a semcard creation daemon that watches file directories and applications for various events and then triggers semcard creation. Alternatively it can be done manually by the user from a menu embedded in applications. In all these scenarios various events may be set to trigger semcard creation and modifications:

saving a document or data item
creating a document or data item
opening/viewing a document or data item
modifying a document or data item
transmitting a document or data item
receiving a document or data item
deleting a document or data item
integrating documents or data items with existing file servers, databases or search engines Semcards embody metadata about their target reference as well as their own structure; they are self-describing and are structured in a type-attribute-value form, where type is the unique type of the data they represent, attribute is one or more metatags, and value is one or more metadata elements. Semcards can represent anything, and they provide detailed information about their own structure, meaning, functionality, content, relations, policies, permissions, procedures, history, statistics, authors, users, owners, goals, and state. Semcards are both machine-readable and human-readable; human-readable because they contain rules and policies relating to how they interact with and are manipulated and read by humans. A semcard's associated display rules dictate how the semcard itself—as opposed to its target reference—should be displayed to the user. These rules can specify, for example, how the semcard should be displayed depending on the display device used, which render is being used, and what purpose the semcard is being viewed for. The rules can specify how, for example, meta-data (or data values) in the semcard should be organized and what labels should be used for them, if any, as well as what aspects of the semcard appear as interactive elements in the interface, and the results of specific interaction with those elements.

Semcards can be-transmitted over computer networks using email, traditional network routing and communications protocols, Web protocols, peer-to-peer and Web services protocols, new semantic routing protocols, etc., and can be stored on any computer-readable media. Semcards can act as search queries, by linking them to semcards designated as offers or requests, and specifying acceptable ranges and matching rules for the various semantic dimensions and values of the semcard, as described below.

The benefits of semcards are evident directly to their human users in their daily work with information, augmenting current computer systems in many ways, including but not limited to more efficient ways for users to navigate, browse, search, share, manipulate, display, link, organize, access, and store their data. Semcards are also beneficial to current computer systems by enabling more intelligent and accurate automatic manipulation of information, including but not limited to: routing, storing, matching, searching, meta-tagging, integrating, organizing, filtering, form-filling, linking, and displaying of information. Rules give the owner of a semcard direct control over how semcards; and their referenced resources, are searched, matched, shared, duplicated, copied, on the owners' own computers as well as over a network of computers such as the Internet. These rules can be event-driven or periodic. A rule could for example specify that "when recipient gets this message, send me a receipt and also forward receipt to a database; wait for a reply from recipient; if no reply is received, remind recipient to send a reply in 3 days." Semcards can represent streaming media, specifying the metadata bout the source from where to get the data, and what to do with it. This can be set up to be either pull or push, with policies defining conditional behavior for the standard event types associated with such streams (i.e. glitches, delays, overflow, loss of connection, end of stream, etc.).

Semcards and their copies on other systems can be set to have a time to live (TTL), such that they expire after a set period of time. Their rules will then determine whether they should be deleted, compressed, etc., and whether the original should be notified. Semcards can also be manually expired, independently of their TTL, by their author. For a local semcard this is simply moving the state of the semcard from active to inactive. For a remote semcard living elsewhere on the network this involves sending a special termination signal with the particular semcard's unique ID. The same mechanims can be used to rescind a semcard that has already been-posted.

Semcards link to other semcards using a Link semcard. Link semcards are a kind of semcard that contain rich metadata about the relationship between things, as represented by two connected semcards. In FIG. 6 semcard 1 points to semcard 3 via semcard 2. In a preferred embodiment, each semcard has its own existence, history, and global unique identifier (GUID). For example, a Document semcard can be linked to a Person semcard using an Author-Of Link semcard. A constraint system can be provided such that only certain kinds of links can represent relationships between certain kinds of semcards. The constraining system represents the logical way in which semcards can be linked. More specifically, it represents ontological knowledge about how the world is composed; a link between two semcards should 'make sense' or be comprehensible to the semcard management application and its user, that is, the link should be consistent with the ontologies contained in the system.

Semcards can be used to integrate semantic representation with legacy data. For example, the system can supply a simple server that can receive a query from a network and then translate it into one of several popular legacy formats (such as SQL) or custom formats (defined by admins) and transmit it to various legacy systems, then get results and reformat them as semcards, then supply these back to the party issuing the query. A query can be received at a network node for any white papers about software applications. The node can then translate this query into a query to a local legacy search engine. The search engine can conduct a legacy search of local databases and return any search results to the node. The node can then either embed and return those results within appropriate semcards on the fly (if the results are rich enough) or further analyze any found documents in order to create semcards for them to then supply to the party issuing the query.

Another approach is to datamine entire collections of digital entities and create semcards for the selected digital entities in advance so that semcards do not have to be created in real time. Searches are executed against the collection via standard legacy search engines and when results are found instead of reporting the raw results or attempting to generate semcards at that time, the corresponding pre-existing semcards for those digital entities are returned to the user from a database of semcards.

Data mining can proceed in at least two ways: unstructured and structured data mining. Unstructured data mining involves various artificially intelligent agents or other software artificial intelligence applications that scour resources and determine the identity and nature of these agents. Based on this they can then create semcards for representing the resources. Structured data mining allows a schema to be created that guides the agents directly in creating particular classes of semcards. For example, an agent can be created to make "white paper" semcards with particular policies, targeting and attributes for qualifying documents in some predefined, well-structured content collection. The agent scours the collection and for each qualifying document it then creates a semcard from the semcard template, automatically filling it in with information about the white papers using the agent's built-in intelligence. Thus, the agent already knows that the documents in the collection are white papers having certain attributes and policies so it can more easily create semcards for them less need for advanced artificial intelligence.

The semcard management system ensures that semcards and any content they refer to are not separated, i.e. that the targets of semcards are not lost. A mechanism may be provided such that pointers from semcards to target content are maintained so as to have correct addresses for the target content. One solution is to have a semcard representing a target content, such as a document, connect to the target via a link semcard. In addition, when either semcards or the target content objects are moved, the pointers are updated or the associated objects are moved together. Another solution is to wrap content objects in semcard containers such that the content objects do not exist outside of such wrappers. That is, documents are stored inside of semcard objects. Another approach is to move any objects described by Semcards into a protected storage environment such that they can only be moved under the supervision and policies of the Semcard management application.

Another approach is to embed semcards into documents, websites, products, etc. This can be done, for example, by embedding semcard tags in content or by attaching semcard files to content objects, by either including the files as hidden data in the documents, or as links or attachments to the documents.

Another approach is to maintain an association table of mappings between semcard files and target content files such that when files are moved or changed the corresponding entries in the association table is updated. This table enables the associated semcard(s) to be found from any file, and the associated file(s) to be found from any semcard. The association table must be periodically updated on a regular basis or at least updated when changes are detected/made to semcards or any files that are indexed in the table.

To accomplish this a daemon could be provided to watch for changes and update the association table accordingly. There are various ways to implement this. In one case daemons can report to some central location what files they have so that other daemons can locate those files. When files are moved to locations that are not watched by daemons objects are wrapped in semcards or semcards are embedded in objects when possible.

A semcard can be divided into four main sections, (a) the What—the attributes of the offer/request and any further content payload, (b) the Who—the identity of the sender and the specification for what recipients are to be targeted, (c) the How—any goals, rules, policies, reply methods, etc., and (c) Where—the history of this semcard, modifications, copies made, who has viewed it, links to prior versions of it, etc. These are conceptual categories of organization that may exist in isolation or exist with other features for organizing the semcards' parts; this division can, but does not need to, correspond to the way the semcard is represented to the use.

1) The What part of a semcard describes whatever the semcard represents and/or carries, for example: a Web site or document, an opportunity, and advertisement, data or knowledge, a file, an event, an audio recording or electronic book, a Web service, software object, a collection of other semcards or a non-digital product or service, or ideas and tacit knowledge.

2) The How part of a semcard defines the semcard's policies and procedures.

3) The Who part of a semcard contains an authenticated person (visible or anonymous) representing the owner of the semcard. This part also contains addresses for various recipient individuals, groups, or a fuzzy definition of the qualifications for valid recipient individuals and groups, lists of users who have modified, copied, received, or deleted the semcard, as specified by the semcard's policies about what kind of such data should be stored, and other information regarding users or agents.

4) The When part of a semcard contains a compact representation of the history of events related to the semcard. The decision about which events are stored with the semcards, which events are linked from to the semcard, and which events are ignored, are determined by the rules related to the semcard's history.

Figure 7:
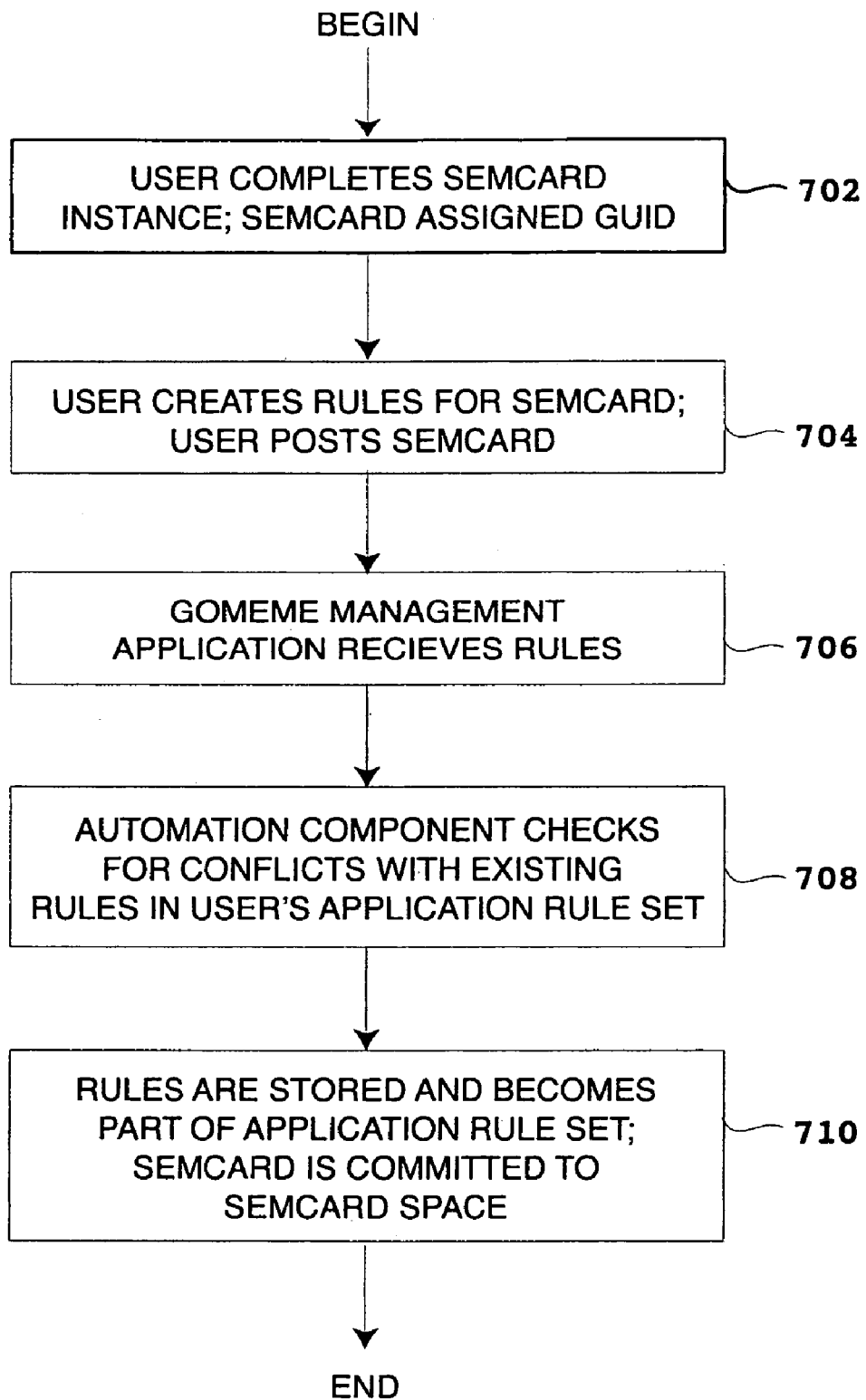
FIG. 7 is a flowchart illustrating a method of the internal process for creating a semcard.

A method of creating a semcard is described in FIG. 7. At step 702 a user selects an empty instance of a semcard type, and fills it in with content values. The semcard instance is given a global unique identifier (GUID). When creating a semcard manually or a document, for example, the author will be provided with a selection of valid values for a particular slot, as defined in the ontology, such as "author of", which will display instances valid for the slot, such as names of particular people or organizations (only people and organizations can be considered "valid authors" of documents). This would typically include all names of organizations and individuals (all potential authors) in the user's semcard space.

In the semcard system of the present invention, all data items are stored on disk continuously, that is, immediately after they are entered by the user, so the user never has to manually "save" a semcard—this is done automatically. Once the semcard is created, the user can commit—or post—the semcard instance. Referring to FIG. 7, at step 704, the user creates rules for the semcard management system, as well as rules pertaining to types of semcards, and instances of semcards. The rules can specify, among other things:

1) Whether the semcard can be linked to by others

2) Whether various operations on, or modifications of, the semcard need manual approval of the owner; and 3) How the semcard's content should be updated automatically At step 706 the system receives a new rule, either created by the user or automatically by the system, or by some external process or third-party, and compares them with existing rules it already stores. These rules can apply to semcards, to the semcard management application itself, or collections of semcards, in which case they are referred to as "global rules".

These rules may be related to access privileges, how information is displayed in the user interface, or any other feature of the system that can be controlled by rules. User-created rules, as well as default rules provided with the semcard management application, are managed by an automation component with a rule engine.

At step 708 the automation component checks for conflicts with existing rules in the user's semcard system space. If no conflicts are detected, and the creator of the rule has permission to submit the rule, the rule is stored and becomes part of the system's rule set at step 710.

Some rules may be stored with the semcard and processed by other components, for example, access privileges maybe handled at a lower level. Access privilege rules differ from display rules in that they are each represented differently.

Semcards can be transformed to various formats using methods in the semcard system. One format is intended for efficient storage in memory. Another format enables efficient transmission of the software objects over a network. Another format enables interchange with third parties. For example, this format may be serialized XML or RDF or other applicable format. Semcards, and any part of their metadata, can be easily encrypted.

Semcards, and any part of their metadata, can be digitally signed to authenticate their origins and trustworthiness, and to control access to them, and manipulations of them.

Many users may create links to a particular semcard external to the user's semcard space on a network; each user may create a different set of links. The result is a network extending beyond the user's peer but residing on each user's semcard management application which relates to that particular semcard. If these users share their network with the world, it is now possible to traverse a knowledge network that is the sum of all the users' networks, where the center point is the particular semcard.

When a semcard has been posted, no matter who it is addressed to or how, it will be handled according to its own rules, and other rules in the system. The content of the semcard can be mined and related, and automatically linked, to other semcards in the system (via newly created link semcards). Mining is typically controlled by global rules for the semcard system. The process finds connections between semcards by examining values and semantic dimensions in each semcard. One of these tasks is checking for duplicate or repetitive data and concepts to reduce data storage. It can also link the new semcard with existing semcards using inferences and other techniques.

The system also accepts plug-ins that perform as experts in determining where and when there may be connections between semcards. For example, a plug-in may be an expert in corporate formations and organizations. Thus, it knows that an organization has a founder. If a semcard is created for an individual and that individual's name is also in an Organization semcard, the plug-in can draw the inference that the two semcards should be linked based on the plug-in's own rule set, which enables it to draw the inference. The system can also make any obvious corrections to values in the slots.

On a network, as copies of a semcard move around, a target referent is handled according to the semcard's policies. The options available are 1) keeping the semcard and the payload together at all times; 2) keeping them separate at all times; and 3) keeping the payload within close proximity so it may be cached. For this purpose, the target reference object can be contained within the semcard, can be kept with the semcard at all times but separately, or it can be kept remotely.

As described above, a link between two semcards is itself a semcard. However, the process for creating a semantic link is somewhat different from the method of creating an object semcard. Although the user may often manually create a link, its content values are typically managed by the semcard system rather than explicitly by the user (although the user can, under special circumstances, modify a link's content). Often the links are created fully automatically. Links created by the system may be assigned a confidence value, which represents the automated system's estimation of its correctness (i.e. is this the right type of link between these two other semcards). Generally, a human-created link will not have a confidence value, or have the highest confidence value possible (except in cases where the human user isn't certain that what they are representing is correct). All links—like all semcards—have an author, whether an automated process or a human. This allows a user to perform searches and queries of the system specifying that links should be authored by a human, or by the system, with a certain confidence value.

To avoid having an object semcard lose a referent target, whether a document or other thing, the relationship between the two is implemented using a Link semcard. A link semcard always connects two other semcards, the source and the target, making links directional. The semantically inverse meaning of any link can be defined in its ontology; e.g. the inverse of "author of" is "authored by". These links are themselves full semcards; there are typically no direct—or "flat"—links from a semcard representing a target referent document and the referent target document or item itself. This means that the link has rich information about the relationship between the semcard representing the refernt target object and and the referent target object itself, allowing the link to be manipulated in the same way as other semcards, via filtering of its values and semantic dimensions.

In certain exceptional cases, link semcards can be "folded into" the source semcard that it links to, to be treated as a "flat" link with no extra meta-data about the link itself. Optionally the whole Link semcard can be folded into the semcard source. This is sometimes done for efficiency or convenience when moving semcards around in a computing device or on a netwokr.

As mentioned, a semcard has a particular type which is typically defined in the system ontology. A user can expand and edit the types of semcards, either by adding to the ontology, modifying the ontology, or adding undefined metadata directly to the semcard. Such additions and modifications can be shared with other peers using the semcard system.

The peer desktop application described here is a system for managing semcards and semantic information; it is a general semantic browser, as well as a dedicated application for managing semcards. The application has several functional components which include 1) an identity manager, 2) a user interface management component; 3) a database component; 4) a network component; 5) an automation component; and 6) a relationship management component. Providing more detail, each semcard peer node may consist of the following components:

Fuzzy matching engine for estimating conceptual distance between semcards.

One or more schedulers for scheduling node events.

Monitoring module that computes statistics based on server events.

Backup manager that manages backup schemes.

Manager for plug-ins that do e.g. mining, logging, monitoring, schedule-based or event-driven behaviors, display rendering, automatic linking, filtering, etc.

Test post facility, for testing semcards and queries before they are posted.

Security, encryption and authentication manager.

System administration suite.

Router module that uses routing tables to forward semcards, queries, offers, requests, etc. to and from other nodes, depending on their meaning and priority.

Display units for displaying system statistics in various ways.

The identity manager manages the identity of the semcard management application's users and groups, their communications, and the identity of match results for users and groups of users.

Another component addresses relationship management. This component manages personal information, essentially a user's identity or persona. It provides a secure way of managing the user's identity. It also contains data relating to all of a user's relationships and data necessary to communicate securely with other peers.

The automation component operates as a single agent but broader than a conventional agent, which has a particular expertise. The automation component has vast reach in the application in that it can communicate with and utilize all other components in the system. It can specify rules, e.g., rules ensuring that a user is valid, that new rules are valid and that there are no detrimental effects caused by the addition or deletion of rules. Rules include permissions, automations, policies, and procedures, both those associated with semcards and those defined for collections of semcards, and for the application in general. The automation component manages and executes automation in the background. The automation component provides the option for a single location where all rules are stored and managed. The automation component is able to process exceptions and can intelligently respond to user through the user interface; it has a knowledge base of user-interaction methods, including graphical, textual, phone (using speech synthesis), and SMS (short message service). This enables the automation component to determine, using its interaction rules, how to interact with its user under various circumstances. For example, if a user is not at a home base, the automation component knows to send the user an SMS message.

The network component is an intelligent component that manages all data received by and transmitted by the application. This component manages and enables all peers, web pages, other networks, web services, other data sources to communicate with the system. The network component also knows when to alert other components based on the class of request or category of data entering the system.

Figure 8:
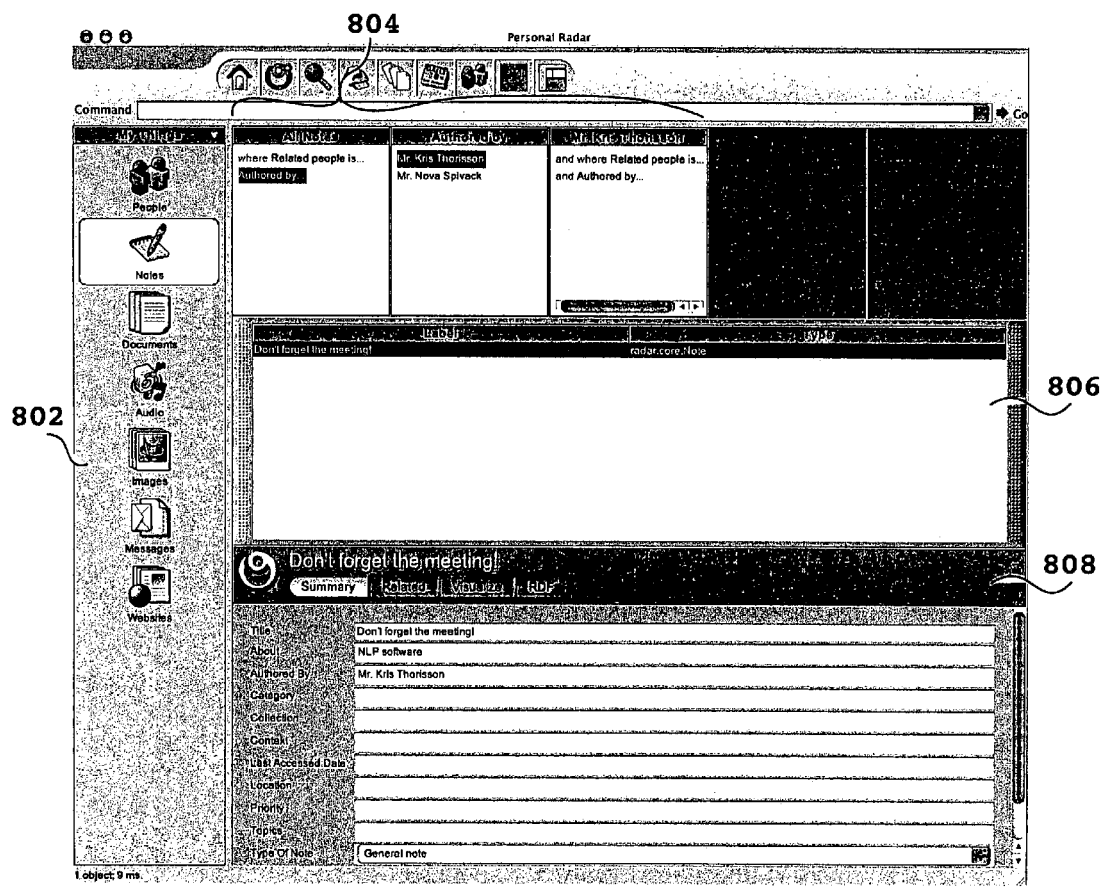
FIG. 8 is a sample screenshot from the user interface of semcard management application showing various panels.

The user interface component provides a user interface for the semcard management application and has several sub-components. Referring to FIG. 8, they include a hierarchical list of "entry points" 802 ("MyThings" in the left-hand column), a filter panel container 804, a results-panel 806, and a viewer 808. The "entry points" column displays standard entry points into the semcard collection, such as type of semcard, as well as user-defined entry points; often these are the entry points that are used most frequently. The entry points can also represent RSS (Rich Site Summary) feeds, hard-disk folder hierarchy, and other traditional elements on a computer system. Entry points can be time-dependent, for example, an entry point could be called "Recently accessed," which the system automatically ensures contains, at any point in time, only semcards that satisfy a particular set of criteria regarding time, e.g. that they have recently been created, viewed, or updated, or all three.

Figure 9:
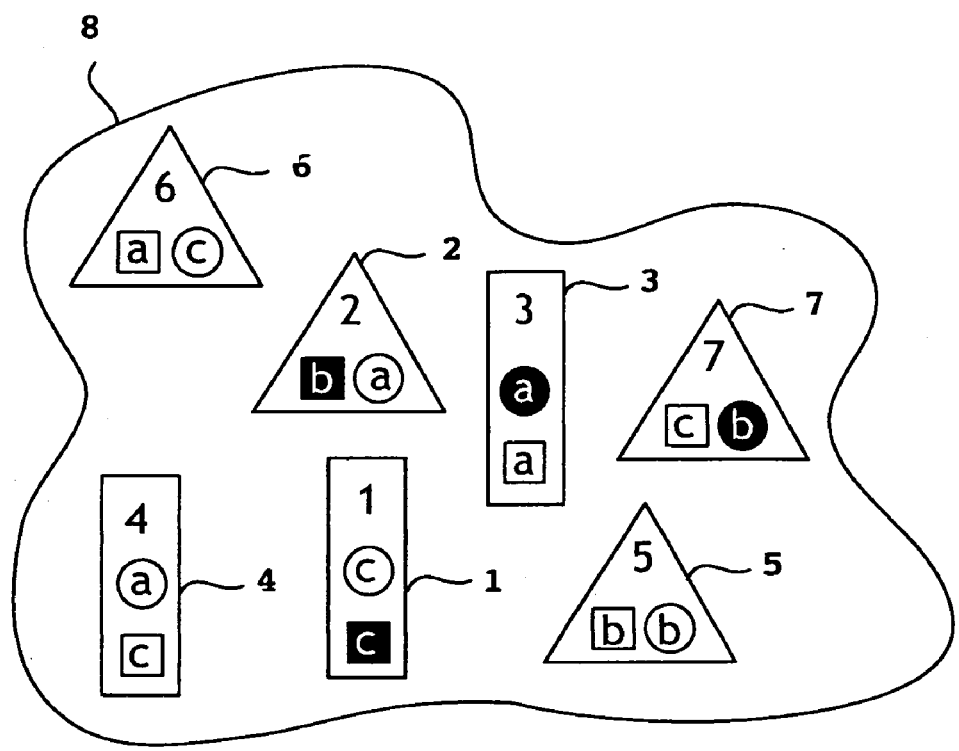
FIG. 9 is a schematic diagram illustrating an initial state of a simplified example of the notion of contexts in the semcard management application.
Figure 9:
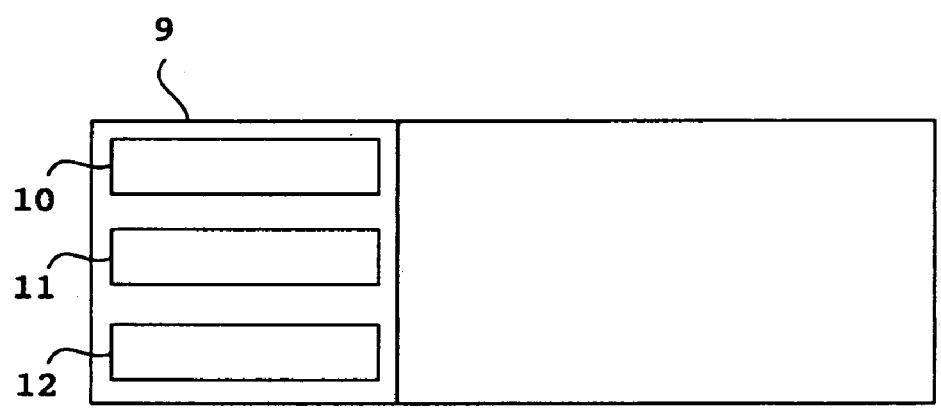

There are also "context" entry points. Contexts are a way to organize semcards into hierarchically arranged categories. In a standard hierarchical setup of contexts and sub-contexts, a sub-context's input is its super-context's output; hierarchical contexts thus being a semantic filter pipeline. Contexts can be applied to any entity which follows the object-with-properties model, as known in the art. Referring to FIG. 9, which presents a simplified example of contexts, a collection 8 of seven semcards 1, 2, 3, 4, 5, 6, 7, of two types, rectangles 1, 3, 4, and triangles 2, 5, 6, 7, with various semantic attributes, as designated by squares and circles inside the semcards, each attribute containing a value, as designated by the three letters a, b and c. A semantic context panel 9 contains three semantic contexts 10, 11, 12, that the user has created.

Figure 10:
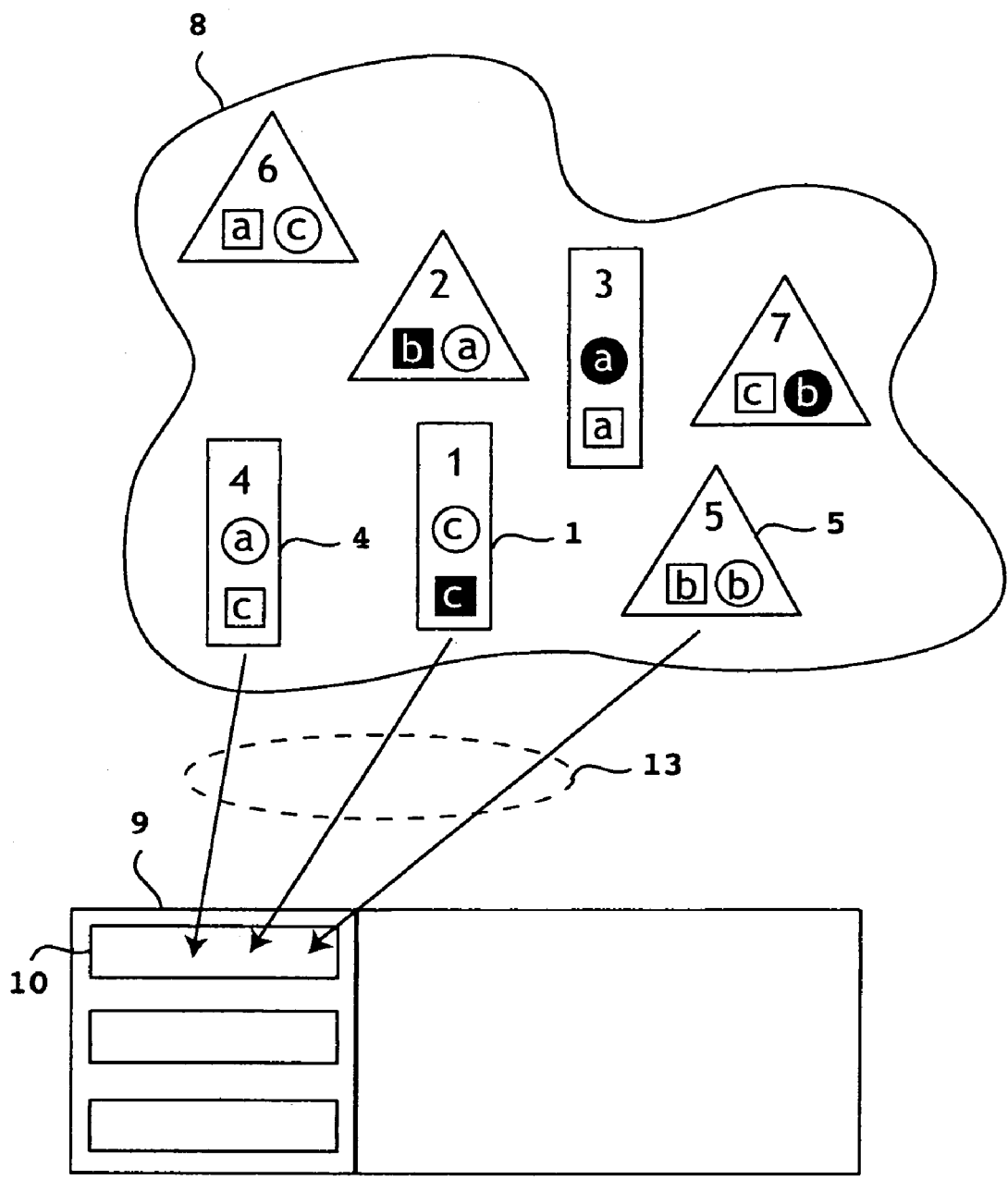
FIG. 10 is a schematic diagram illustrating a context being populated with relevant semcards.

Referring to FIG. 10, to fill the contexts with relevant semcards, the user associates 13 desired semcards 1, 4, 5, with context 10, either by dragging them into the user interface or indicating their association using other methods.

Figure 11:
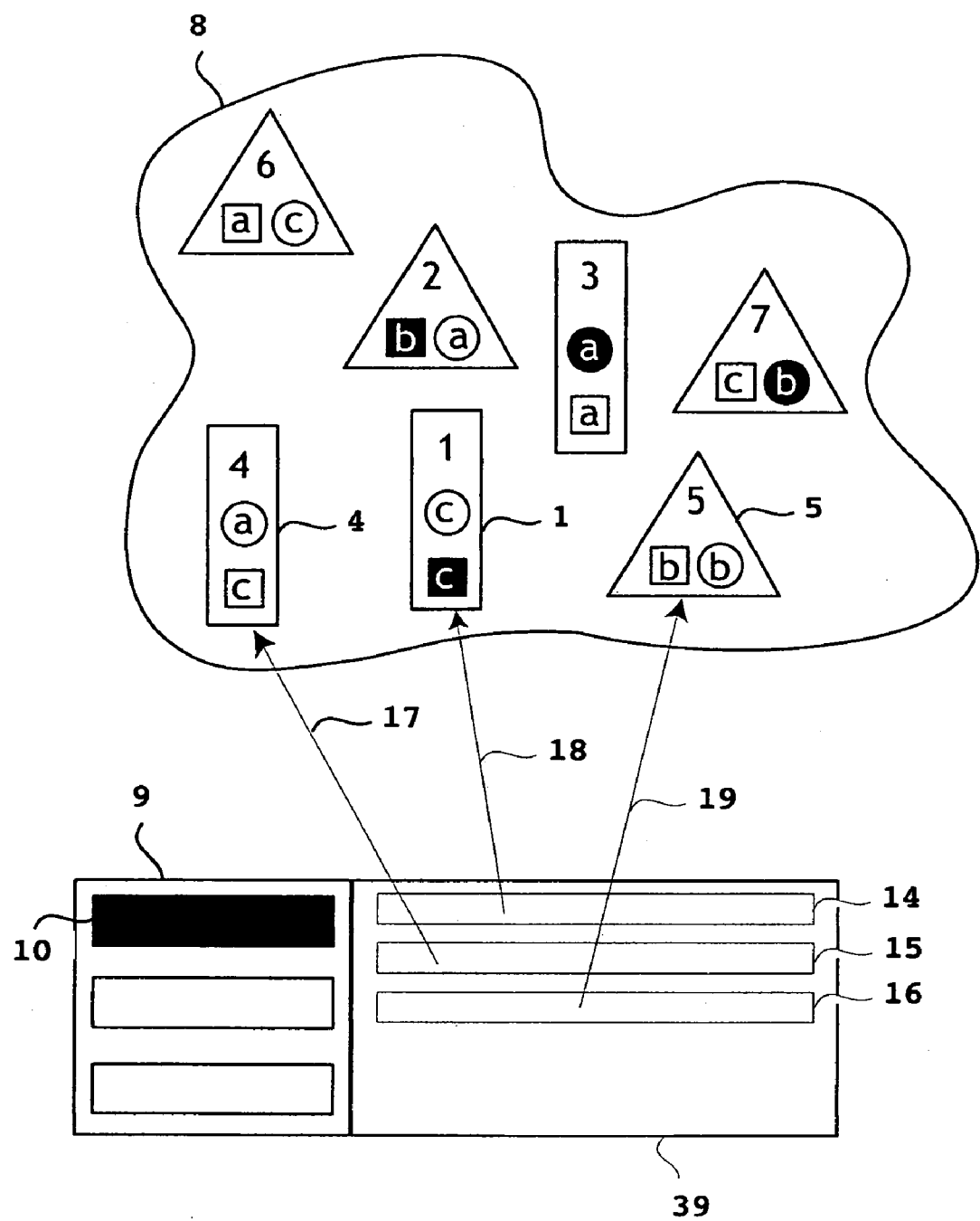
FIG. 11 is a schematic diagram showing the appearance of pointers to semcards upon selection of a context.

Referring to FIG. 11, when the user now selects the context 10 (indicated by black), on the right-hand side of panel 9 pointers 14, 15, 16 appear pointing 17, 18, 19 to those semcards 4, 1, 5 which the user had dragged into the context. The pointers are created by using the GUID of the semcards; the semcards themselves reside in a repository. To the user, the title of the semcard may be used as the name of the pointers, for easy association. When the context 10 is selected, the context does a query to find all the semcards which belong to it, by doing a query against a semcard storage.

Figure 12:
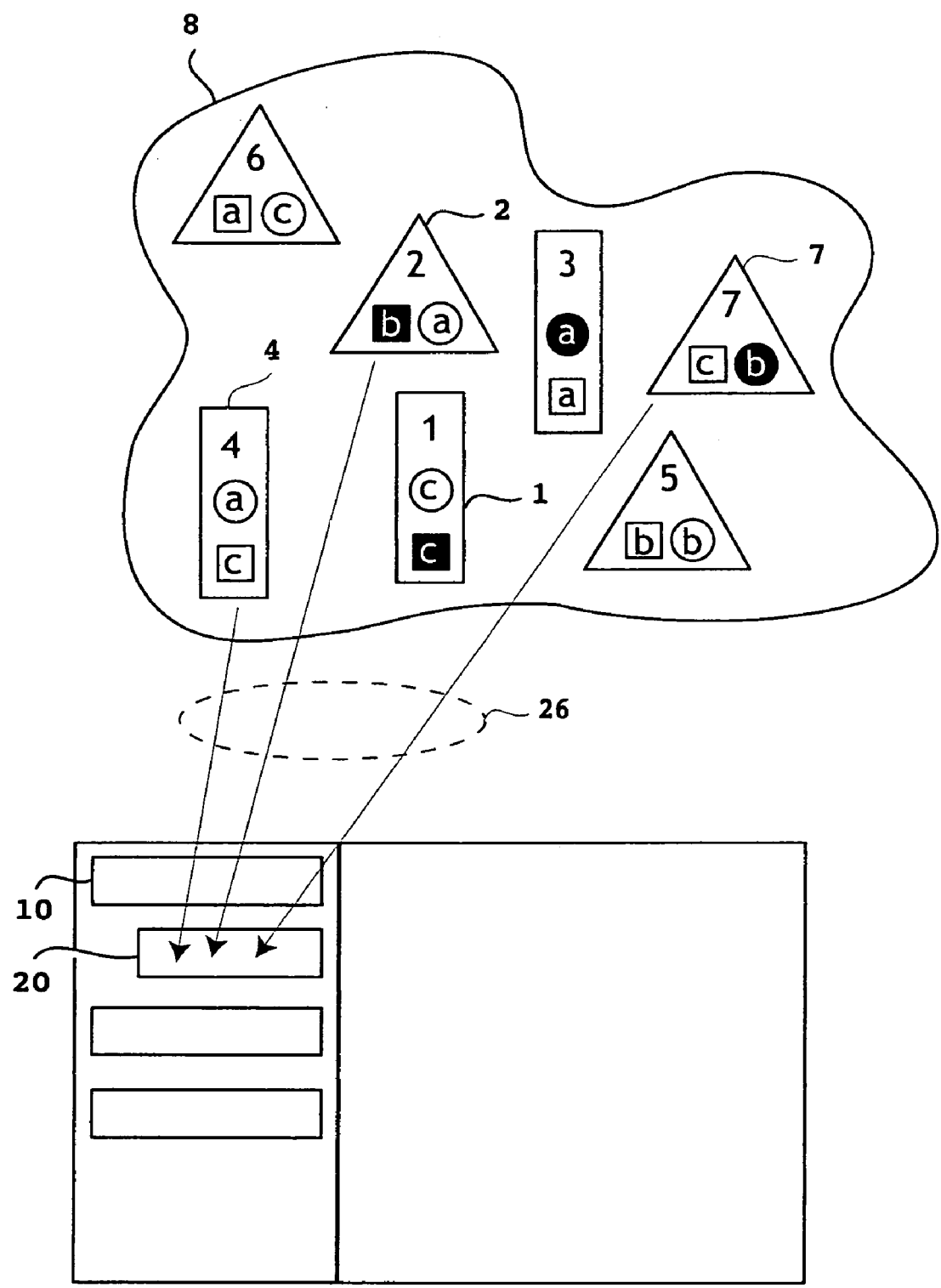
FIG. 12 is a schematic diagram showing the creation of a sub-context to a super-context.

Referring to FIG. 12, a sub-context 20 to context 10 can be created. The user now associates 26 other semcards into this context, but one of the semcards, 4, is the same as was associated with this context's 20 super-context 10.

Figure 13:
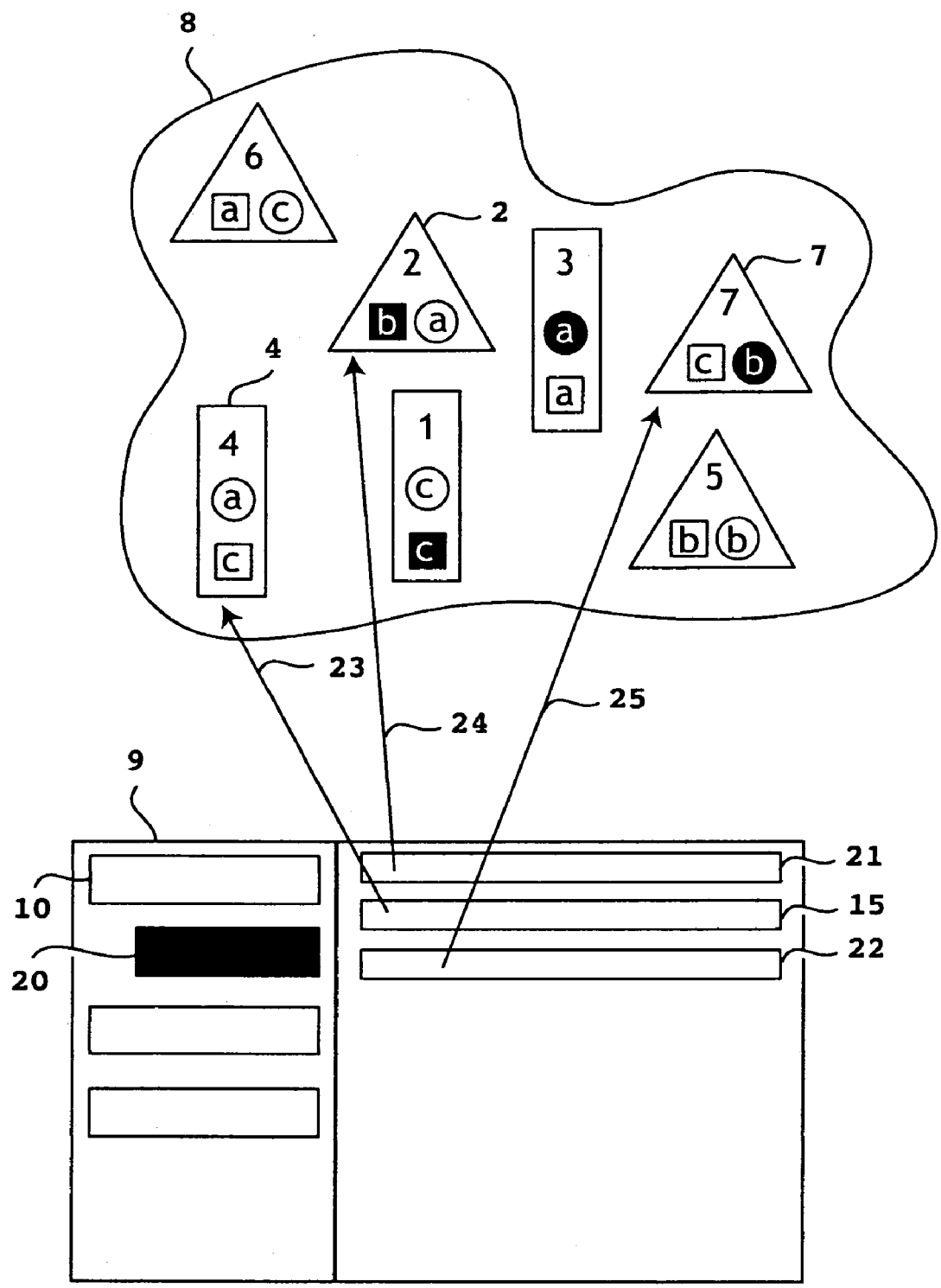
FIG. 13 is a schematic diagram showing the appearance of pointers to semcards upon selection of a sub-context.

Referring to FIG. 13, when the user selects context 20 (indicated by black), three pointers 21, 15, 22 appear which point 23, 24, 25, to the semcards 2, 4, 7 which were associated with this context 20 by the user.

Figure 14:
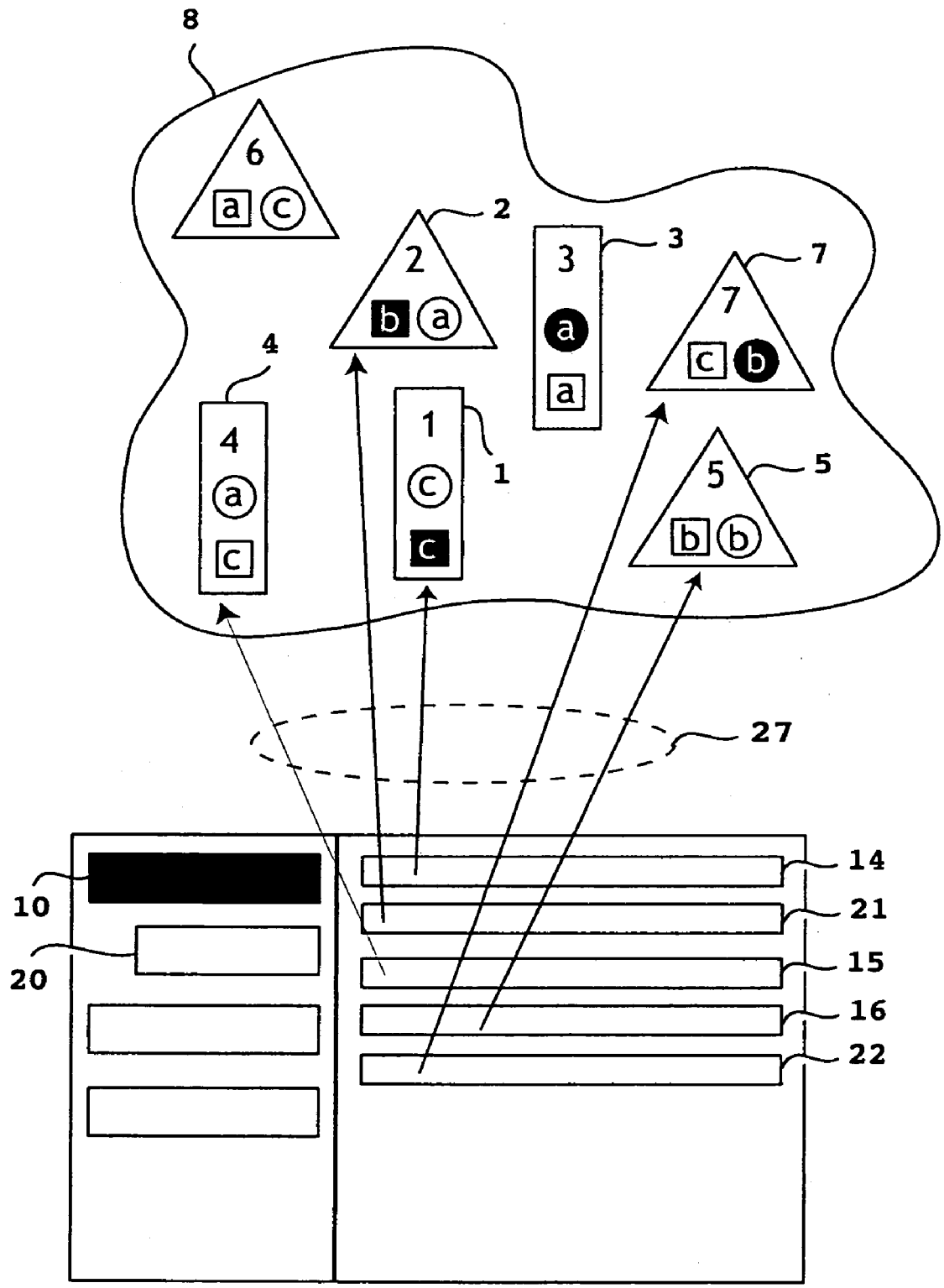
FIG. 14 is a schematic diagram showing the appearance of all pointers to semcards originating from a super-context and its sub-context upon selection of the super-context.

Referring to FIG. 14, the user now selects context 10 again (indicated by black). Now pointers 14, 21, 15, 16, 22 appear that point 27 to the semcards 1, 2, 4, 5, 7 which are included both in context 10 and context 20.

Figure 15:
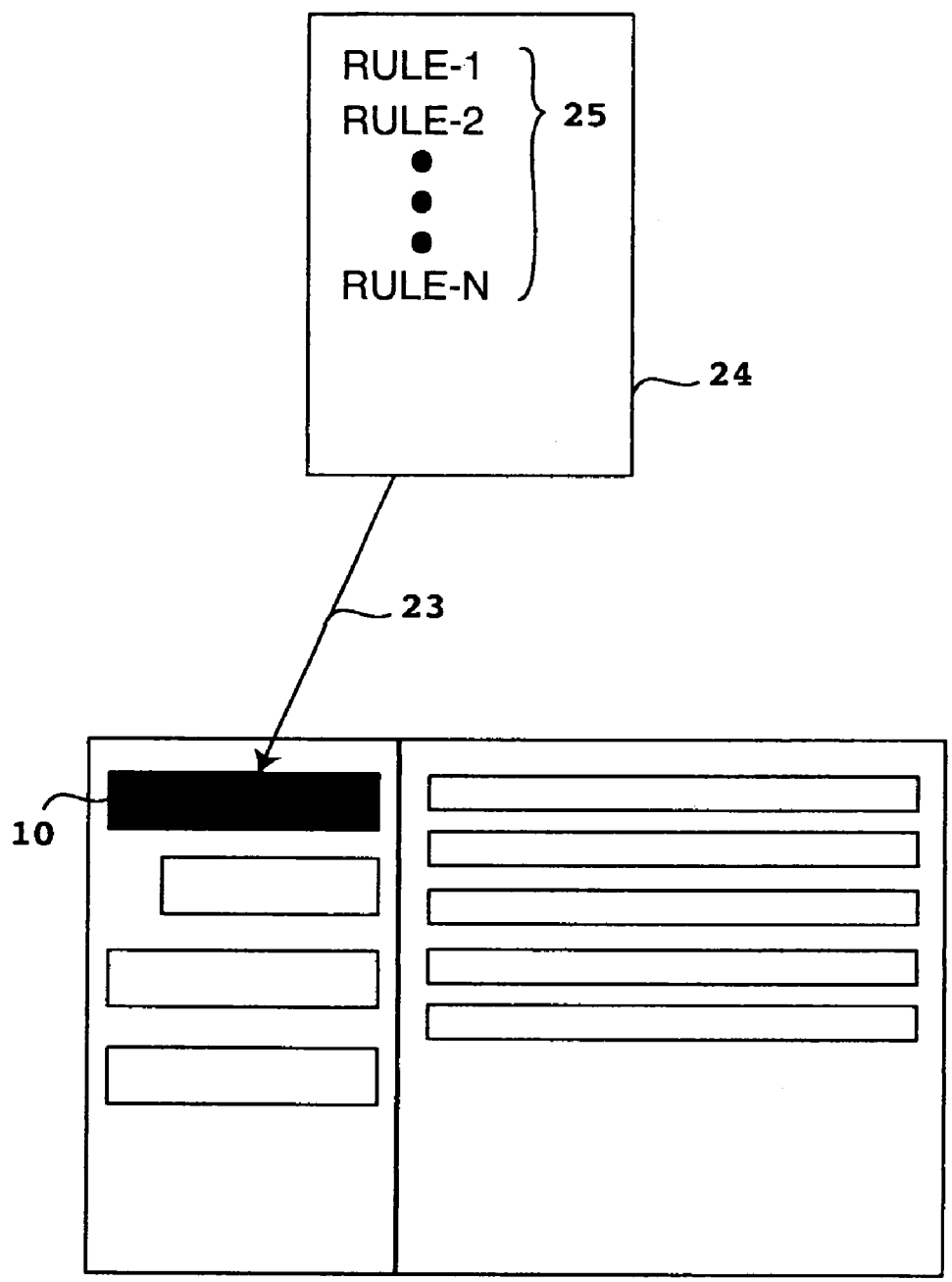
FIG. 15 is a schematic diagram showing the association of a rule collection semcard with a particular context.

Referring to FIG. 15, the user can now associate automation rules with the contexts. Here the user associates 23 a rule collection semcard 24 with context 10. The rule semcard may contain any number of rules 25 pertaining to this context, involving such things as automatically associating semcards with certain features with the context, deleting semcards, doing certain operations on the semcard collection in the context given certain events, and automatically making links between the semcards, inside the context or outside, according to certain principles, etc. Automation rules apply either to only the context that they are attached to, or to that context plus all its sub-contexts. Typically, rules apply only to the context they are attached to. Rules relating to all contexts can be added in the semcard management application as global rules.

Rules associated with a context can specify particular kinds of links that should be created automatically between particular kinds of semcards, given particular events. The rules can apply to only what's inside the context or to how what's inside the context should be manipulated relative to semcards outside the context. For example, rules for creating links between semcards in a context can be different from the rules about creating links between semcards inside a context and outside it.

Figure 16:
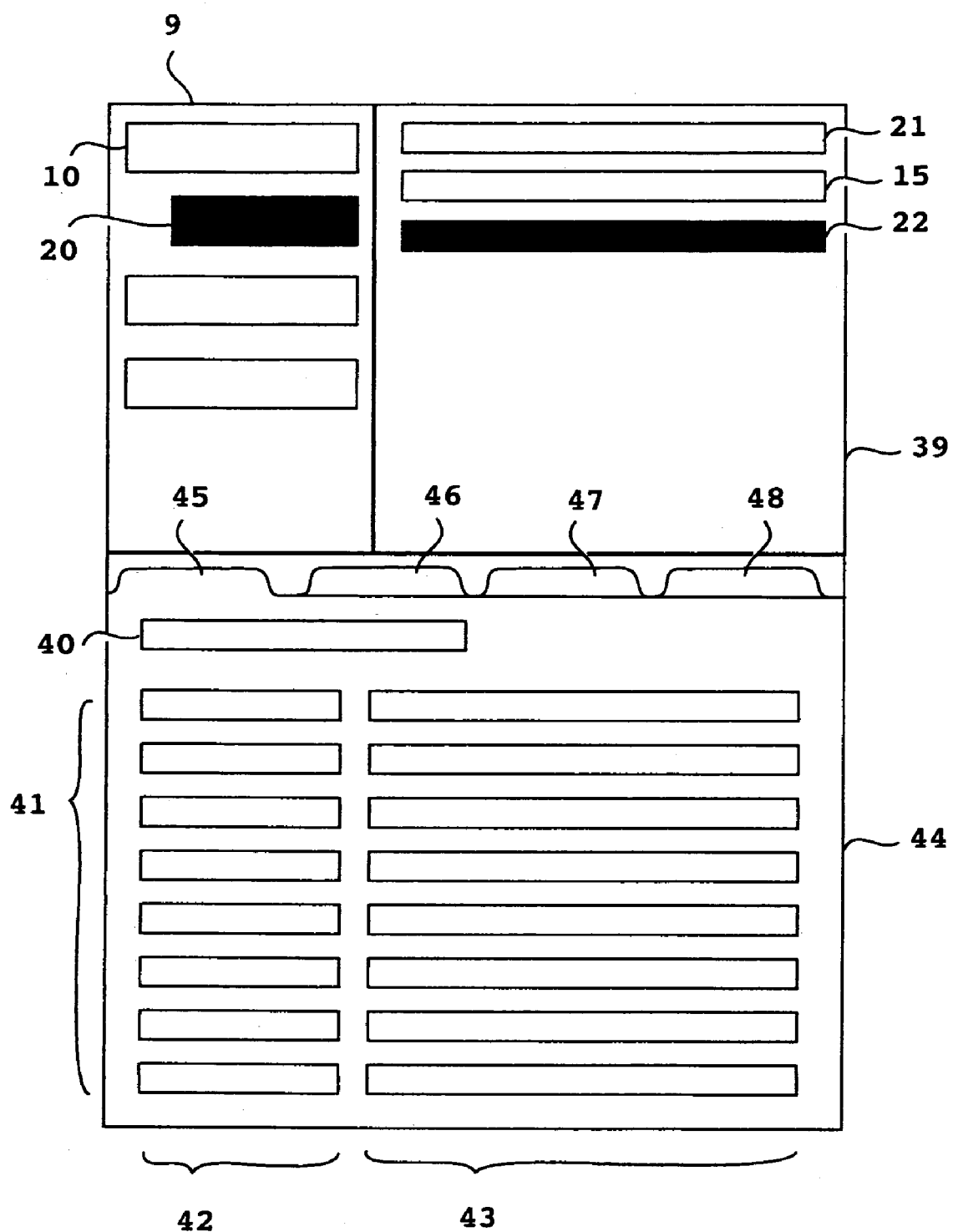
FIG. 16 is a block diagram showing a selected entry point, a results panel, and a viewer panel with tabs indicating various displays.

Referring to FIG. 16, a selected context or entry point 20, filtering a subset of the semcard pool to be shown in the results panel 39, allows the user to select one of the semcard references 22 to be displayed in detail in viewer 44. Rows 41 of meta-tags 42 and meta-values 43 are displayed, along with the semcard's header 40. Tabs 45, 46, 47, 48 allow user to select various ways to display the semcard in viewer panel 44. The viewer panel allows users to view semcards in various forms. These forms, shown as tabs, include a "Summary" view, a "Related" view, a "Preview" view, "Visualize," and "RDF" (Rich Data Format). The viewer panel 44 shows a rendering of this semcard 22 according to its display policies for a form layout.

Figure 17:
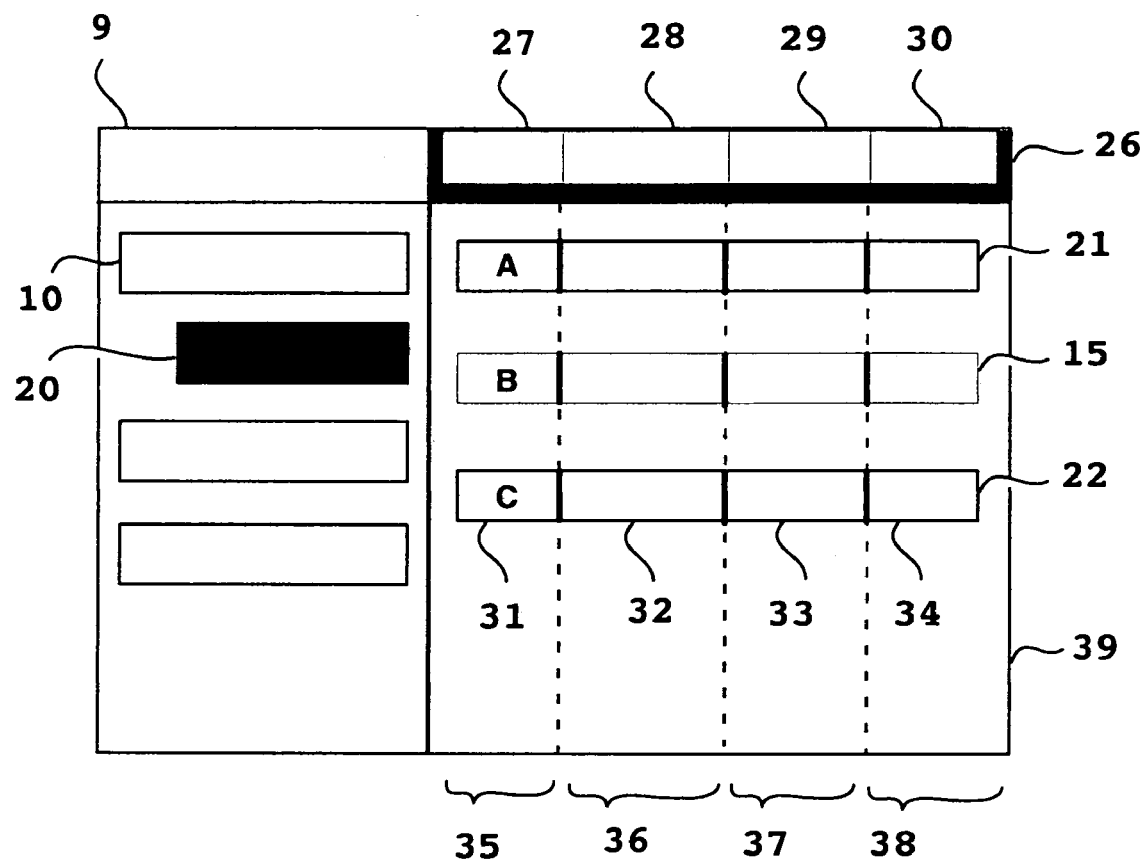
FIG. 17 is a block diagram showing contexts and a results panel containing various sorted semantic dimensions and values.

Referring to FIG. 17 a column header 26 is used to organize the names of various selected semantic dimensions 27, 28, 29, 30 so that the values of these dimensions 31, 32, 33, 34 for each semcard 21, 15, 22 listed in the results panel 39 can be used to sort them according to those values; the user can select a single dimension to sort by. For example, if the values are strings, the semcards 21, 15, 22 can be sorted based on their unique values for that dimension.

A second way to sort using the column header is to sort by one dimension first, then by another, then by a third, for as many dimensions as the user wishes. This would allow the list to be sorted, for example, by time first, then alphabetically according to name, etc. One way that the user can do this is by specifying the order of each dimension in the column header, for example, to sort first by dimension 32, dimension 32 would be placed where dimension 31 is. This way, re-arranging the order of dimensions in the column header determines the order by which the semcards listed in the results panel are sorted.

The contexts can be used to support manually-initiated creation of multiple links, as when the user applies a command to create links of a particular type between two types of semcards for all semcard instances of those type in a given context.

The contexts can be used to support collaboration between the system's automated link generation mechanisms and the user. After a set of semcards have been added to a context, and links between them, the system can use these existing examples to present a more wisely chosen set of Links when the user wants to create more links between the semcards within the context. The system can also create links automatically with higher confidence values, based on the positive examples of links created manually by the user.

A user can share one or more of her contexts with any other user with which she has relationships, via the sharing mechanisms described herein. A user can also offer contexts using one or more Offer semcards.

Contexts can be used as a way to indicate which project a user is working on to other users on a network: When a user selects a context, this context is flagged as the context that the user is currently working in. For example, if the user selects a shared context called "project x", this selection can be reflected in his co-workers' semcard management applications or other application designed to reflect the status of co-workers. The behavior of this feature is controlled via the context's rules.

A user can also select a current working context and perform operations on the peer containing the context. These operations may not be directly on the context or the semcards within the current working context. For example, the user may perform Web searches, creates documents and folders, create graphics, and so on. All these operations, plus operations directly on the current context and the semcards, are automatically associated with the current working context and the relevant semcards.

The contexts can be used to do what is called "programming by example" in the art. To do this, a user creates a context and fills it with "example" semcards. Then she instructs the system to extrapolate, or generalize, rules based on the sample semcards. This can be as simple as one step (e.g. a button click) or, alternatively, the user can give constraints about the rule creation such as "only apply this to new semcards received from relationships A, B and C". The system will then use inferencing and rule creation mechanisms to extrapolate rules from a created context. The user has several options for doing this. One is to create a context and fill it with semcards manually over a period of time (days, weeks), such that when the extrapolation command is given, the system has a rich history of the user's manipulation and use of the context on which to base its generalizations. Optionally, any subsequent manual additions or deletions from and to the context can be a trigger for the system to revise its extrapolated rule set for the context.

The semcard management application has a filtering mechanism which allows a user to quickly select a subset of the full set of semcard instances available. Filtering is done for the purposes of finding a particular semcard instance, for example, or zero in on a particular desired subset of semcard instances. The filtering is based on a collection of filter panels and free-standing rules. The rules determine which features, of the total feature set represented by the semcards in the semcard pool, are presented in the interface, allowing the user to select from the multitude of semantic dimensions represented in the semcard pool, and the values that these dimensions hold. The filter consists of pre-conditions, which must be matched for the filter to fire (become active), a human-readable label, the property being filtered, and optional value(s) being filtered.

Figure 18:
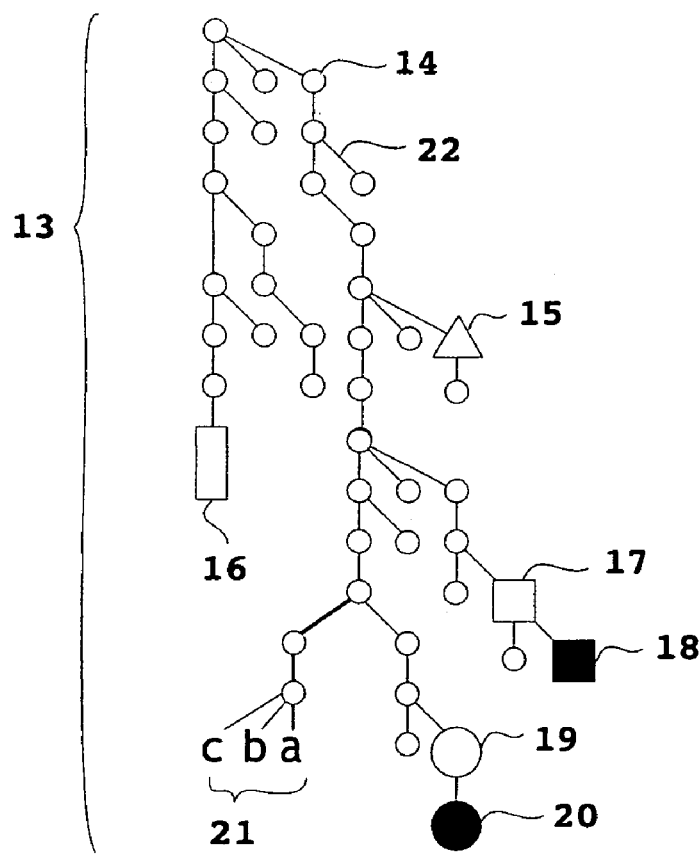
FIG. 18 is a block diagram showing a pool of semcards, their semantic dimensions and values, and their relationship to an ontology.
Figure 18:
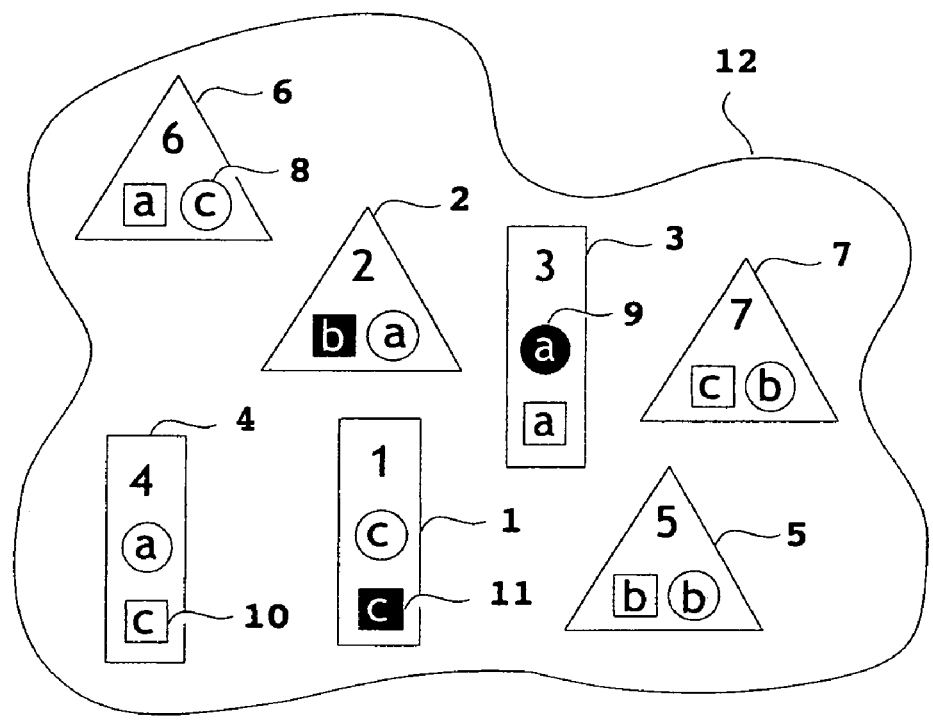

Referring to FIG. 18, a set—or pool—of semcard instances 8 contains two types of semcards, triangles 2, 5, 6, 7 and rectangles 1, 3, 4. These have semantic dimensions, represented here with white squares 10, black squares 11, white circles 8, and black circles 9. Each dimension contains a value, represented with the letters a, b, and c. The semcard types triangle 15 and rectangle 16 are defined in the ontology 13, as are their semantic dimension 17, 18, 19, 20 and the types of values 21 that these dimensions can accept. (Notice that an implementation of the invention would likely use strings instead of the graphical icons used here, for illustrative purposes, to represent these concepts, or a combination of both. Independently of the way a concept from the ontology is represented to the user, each concept in the ontology will simply be identified with a unique ID.)

Figure 19:
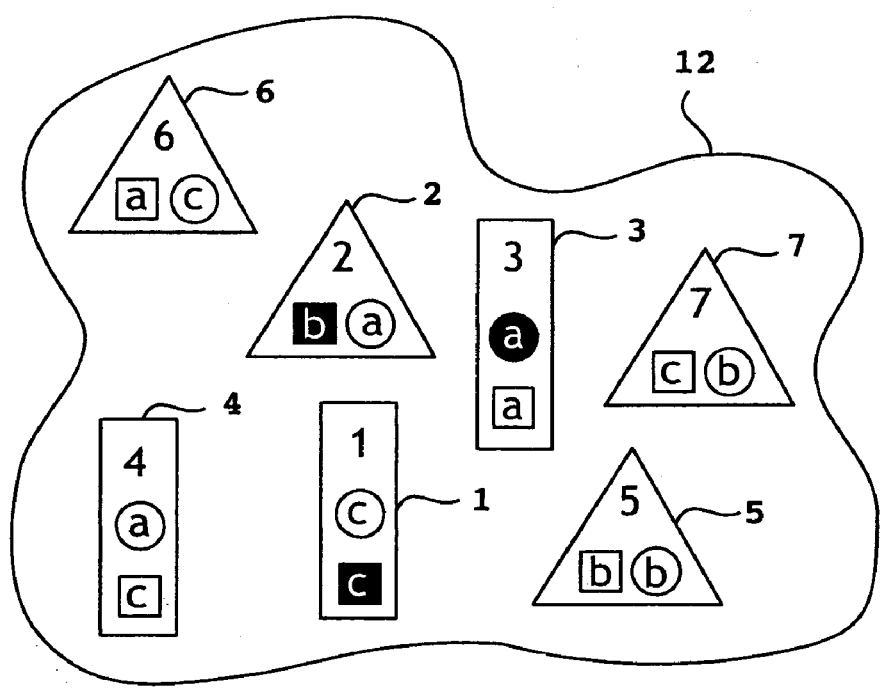
FIG. 19 is a block diagram showing a filter panel container with one filter panel.
Figure 19:
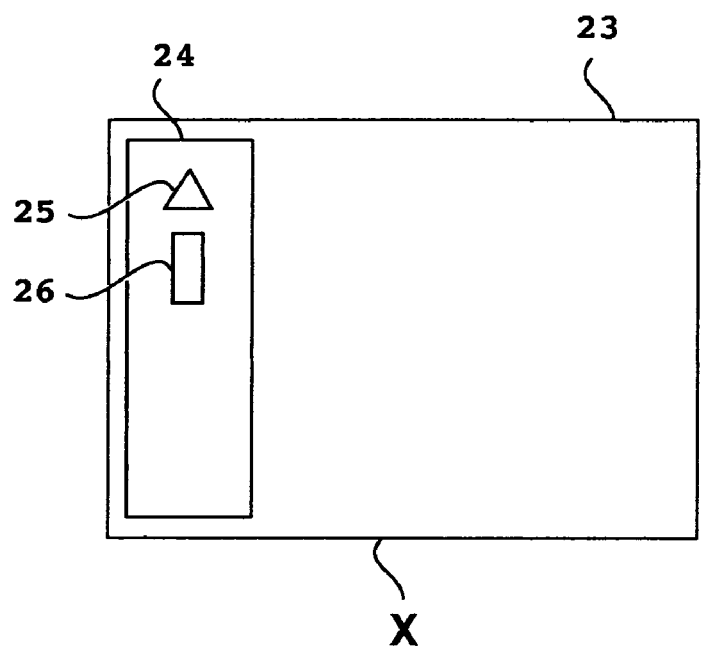

Referring to FIG. 19, a filter container 23, shown as box X, holds a filter panel 24, a user interface concept, which displays two symbols 25, 26. These symbols represent the types of semcards in the semcard pool 8 shown in FIG. 9. The user can choose either of these symbols (e.g. by clicking) to designate a subset of the semcard pool, in other words, to apply that filter to the semcard instances in the pool 8. In the context of filter panels, the semcard types, their various dimensions, and the values, are referred to as "features". Rules determine which features are available for the initial filter panel, as well as each subsequent filter panel that appears as the user selects features in each one.

Figure 20:
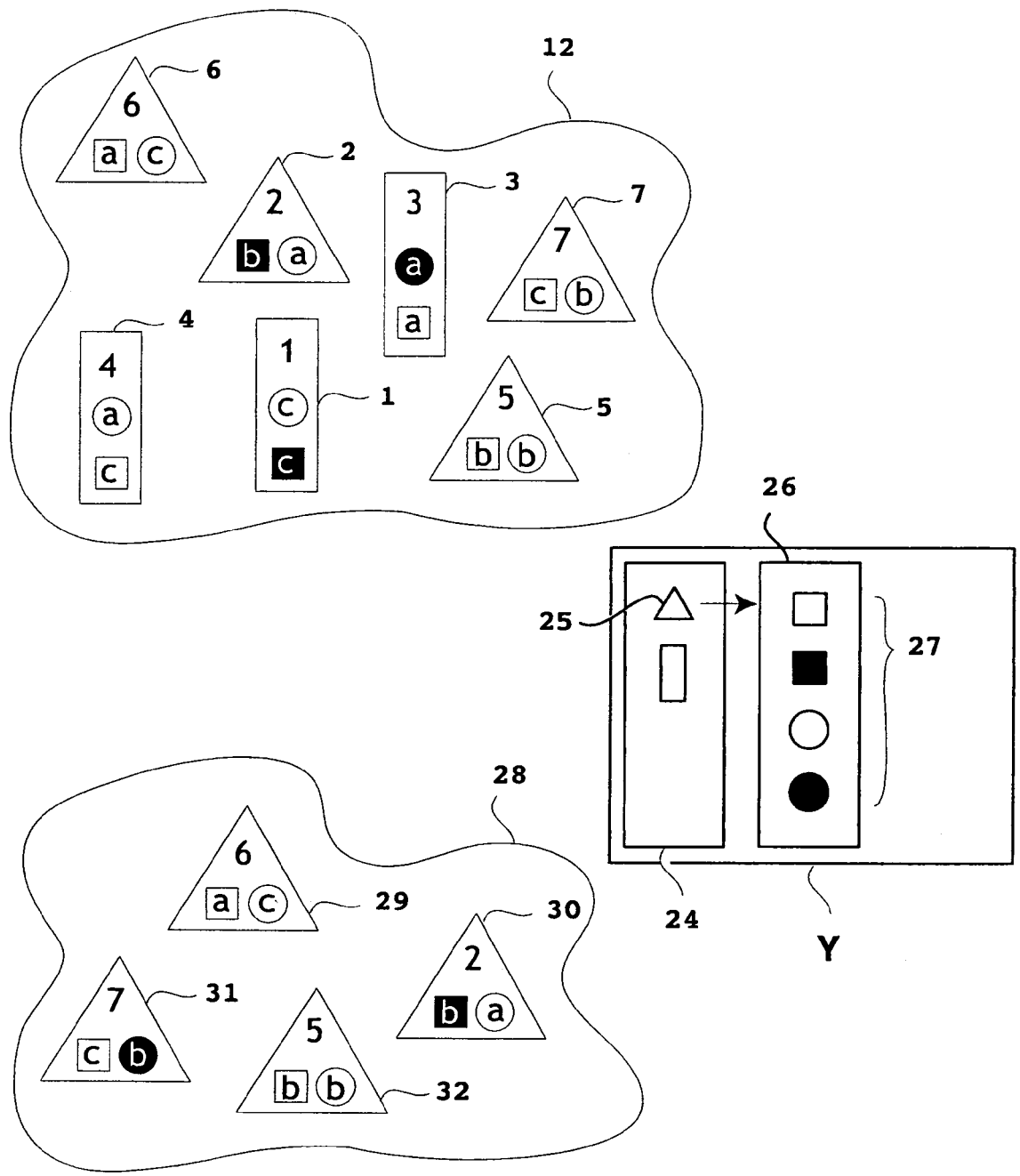
FIG. 20 is a block diagram showing a new filter panel appearing as a result of user selection of a filter panel feature.

Referring to FIG. 20, showing a second state of the filter container labeled Y, after the user has chosen feature 25 in first filter panel 24, such that some of the semcard instances in the pool 8 have been filtered out (namely all semcards which are not of type triangle), resulting in a subset 28 with only triangles 29, 30, 31, 32. Further, a second filter panel has appeared 26, containing a set of features 27 for further narrowing down the subset of semcards from the semcard pool 8.

Figure 21:
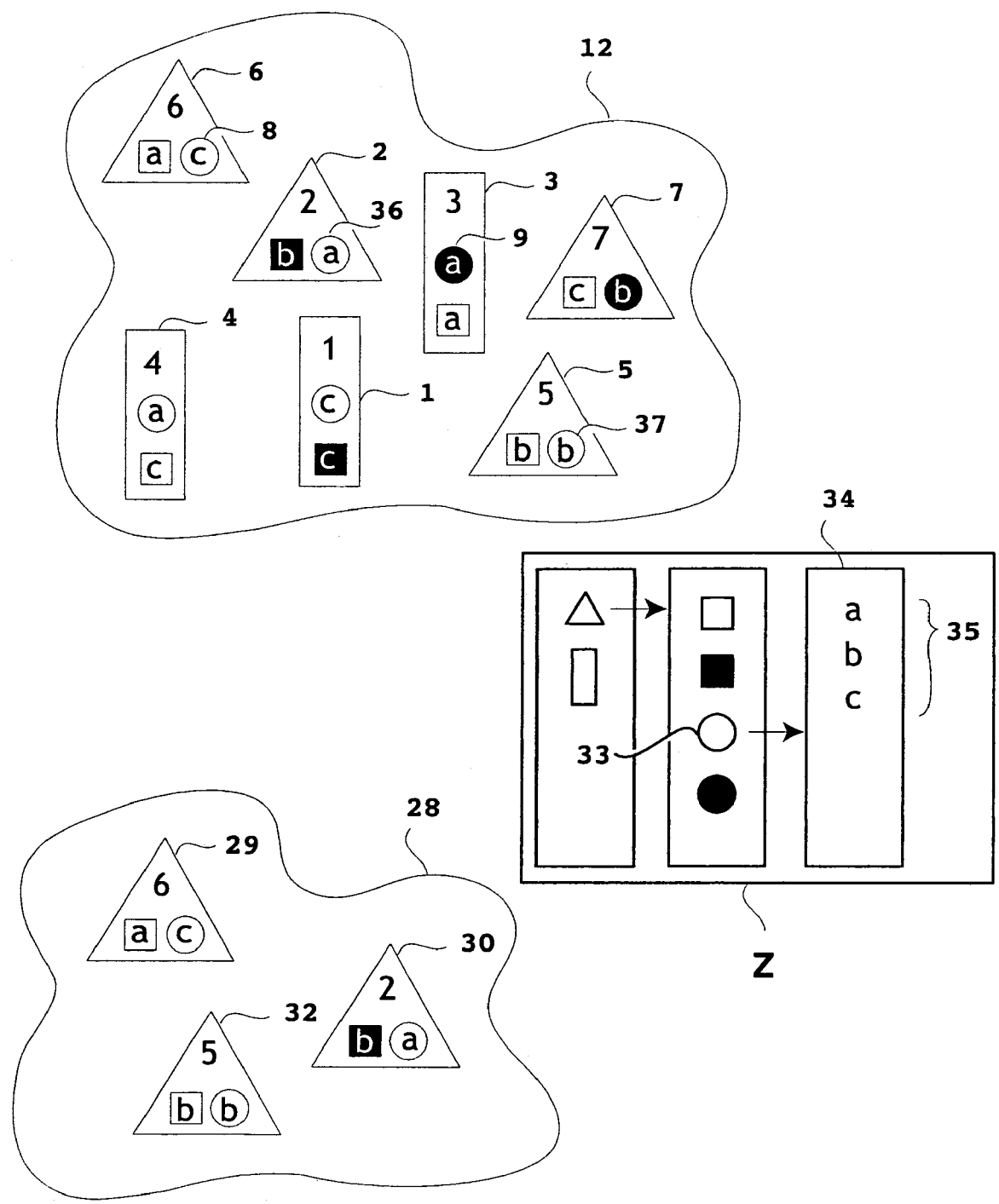
FIG. 21 is a block diagram showing a third filter panel appearing as a result of user selection of a second filter panel feature.

Referring to FIG. 21, showing a third state of the filter container labeled Z, the user has further selected a white circle feature 33, resulting in a new filter panel 34, with a set of features 35 that can be used to further reduce the pool of semcards. The selection of 33 has reduced the subset of semcards 28 to the three semcard instances of type "triangle" which all contain a "white circle" dimension 29, 30, 32.

Figure 22:
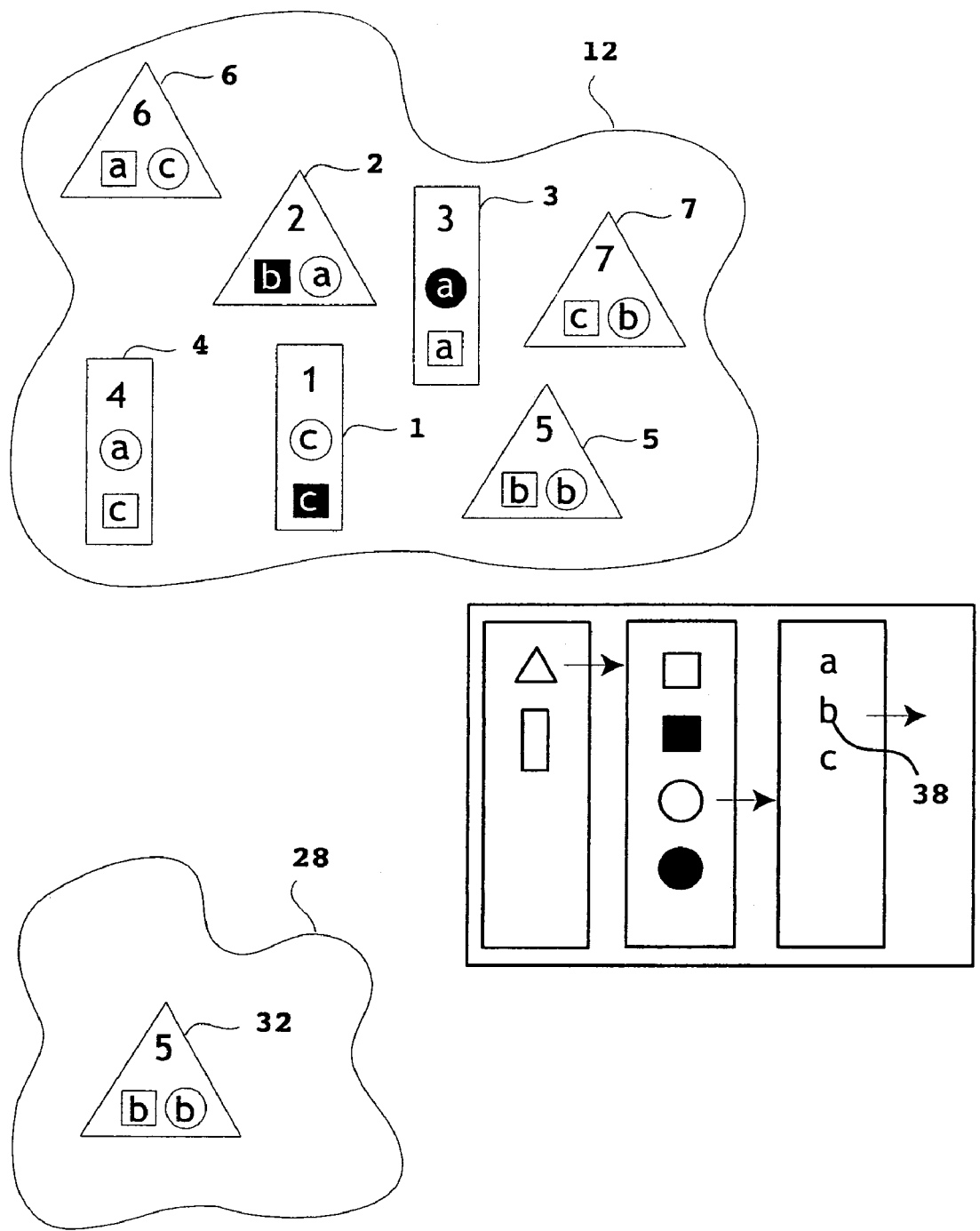
FIG. 22 is a block diagram showing the results of a user selection of a third filter panel feature.

Referring to FIG. 22, the user selects value 38, this time reducing the subset of semcards 28 to a single semcard of type "triangle" which has a semantic dimension of type "white circle" which contains a value of type 38.

Because the filter rules are free-standing, it is possible to apply filters to filters, providing a powerful way to program the way certain semcards and their dimensions and values can be filtered in the interface.

Figure 23:
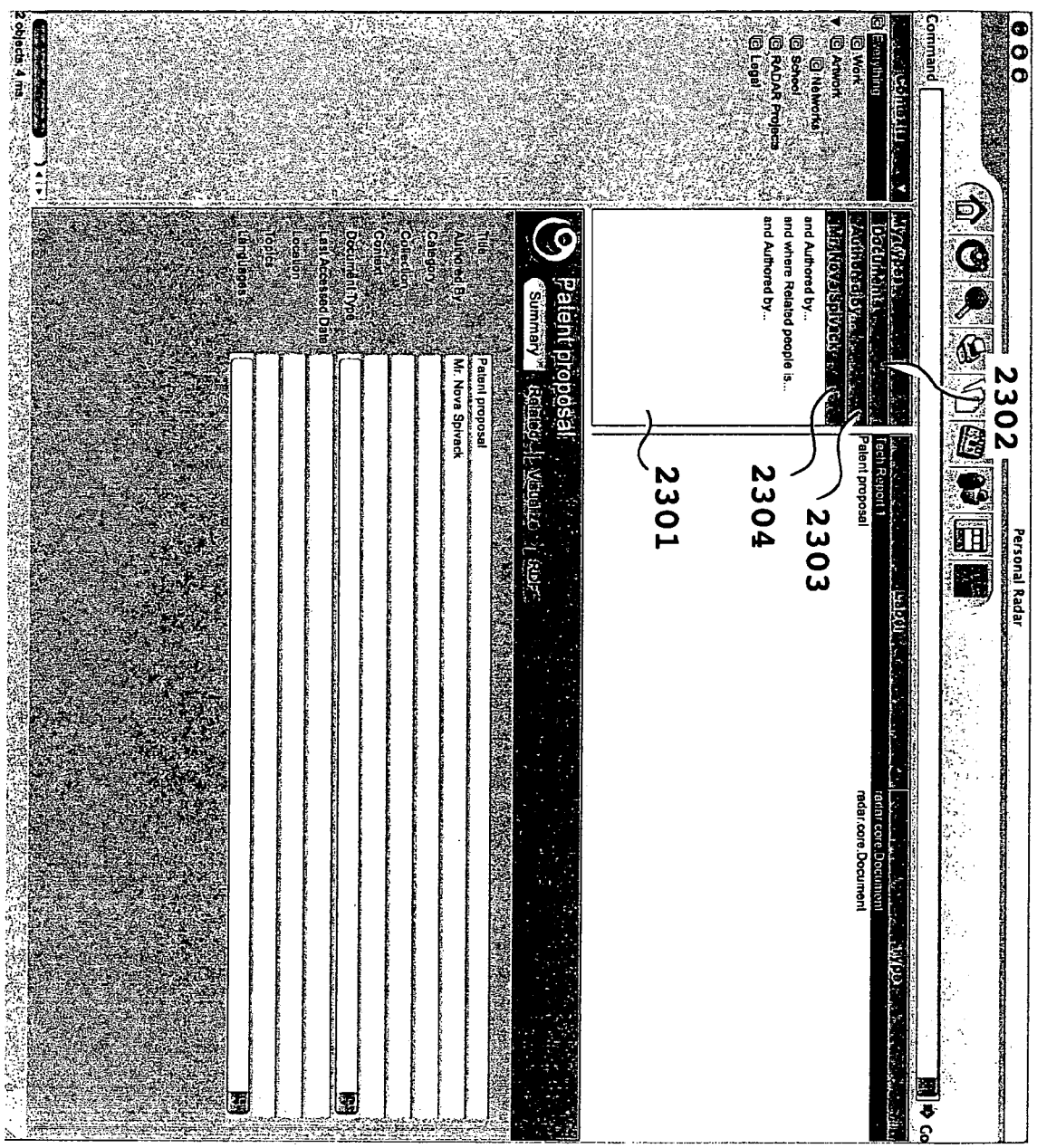
FIG. 23 is a sample screenshot from the user interface of the semcard management application showing a "stacked" layout of filter panels.

Referring to FIGS. 8 and 23, both screenshots from the user interface of the semcard management application the filter panels have two possible layouts: one in which the panels are displayed across the panel as shown in container 804 in FIG. 8. and another in which they are "stacked" or displayed on top of each other as shown in container 2301 of FIG. 23 in a way that only the selected feature labels, 2302, 2303, and 2304, are visible to the user after a selection of the feature has been made. The latter method leads to a visually appealing display and is spatially compact allowing more space for the viewer panel and results panel.

Figure 24:
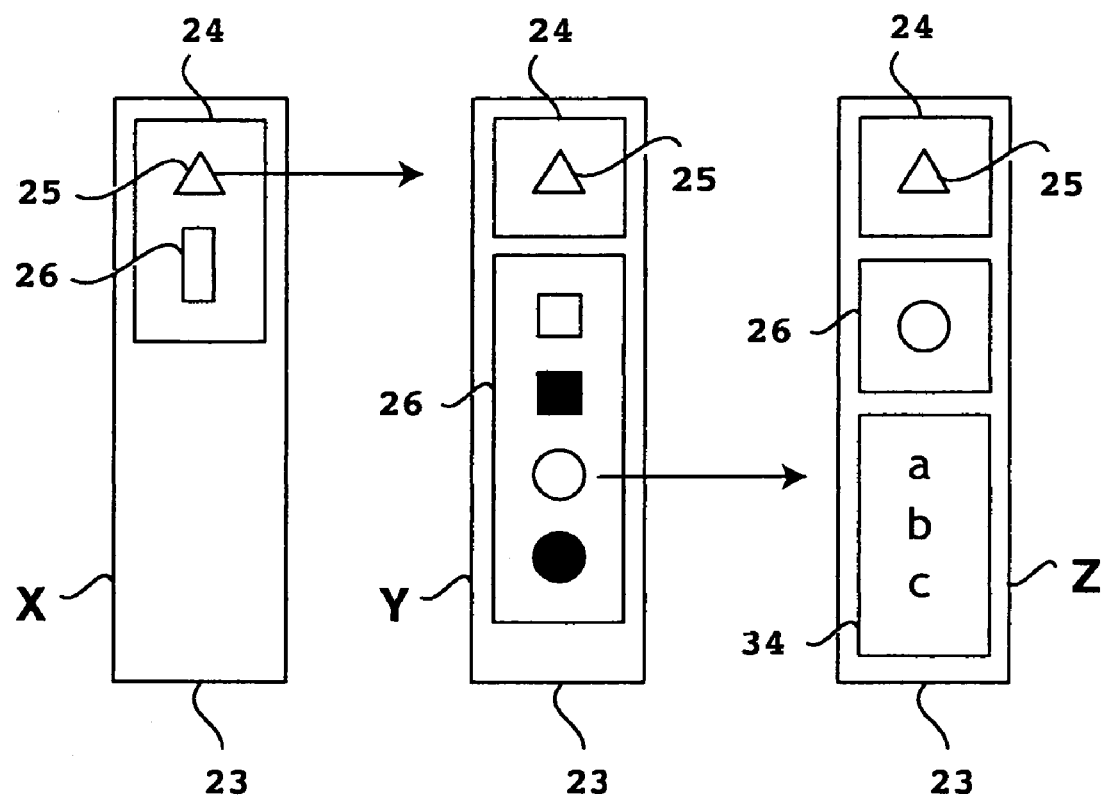
FIG. 24 is a block diagram showing the "stacked" layout of three consecutive states of a filter container upon the application of filters on selected features.

Referring to FIG. 24, each filter container X, Y and Z shows the "stacked" states of the filter panels, corresponding to the same states of the filter panels marked X, Y, and Z in FIGS. 19, 20, and 21, respectively. In the "stacked" version shown in FIG. 23, when a feature has been selected, the filter panel gets "stacked", and is given a title, such as "Documents" and "Authored By", that corresponds to the feature that was selected, as will now further be described.

As mentioned, filter rules can have human-readable labels. These can be used in the display to make the features more readable, e.g. instead of a feature list containing flat labels such as the list {semcard: Document, author: Joe, owner: Frank, moderator: Sue}, the list can be embellished with natural language phrasing such as in this example: {a discussion, authored by Joe, owned by Frank, Sue is moderator}, etc. The generation of human-readable labels is managed by a combination of local rules stored with each filter rule, and by a set of global rules that apply to the whole set of filter panels, and whose job it is to make the path chosen by the user read more like a sentence than a series of nouns and verbs. To take an example, referring to the filter containers X, Y, and Z of FIG. 24, instead of listing the filter path as {a triangle, a white circle dimension, value is a}, the tags could read {a triangle, with a white circle, containing the value 'a'}. This feature becomes especially important in the alternative display of filter panels shown in FIG. 24 where the filter panels are stacked.

The filter mechanism of the semcard system can use one or more ontologies, which can be used for determining which filters are available for any given state. For example, any node above a set of sub-nodes node in the ontology can be considered a "stop flag" node, in the following way. Any dimension which is defined in a sub-node is not displayed per se, but instead its stop flag node, which is higher up in the ontology, is displayed. Referring to FIG. 18, the white square could be set as the stop flag for the black square, and the white circle could be set as the stop flag for the black circle.

To navigate backwards in a previously chosen path such as that shown in FIG. 21, the user simply selects any feature in any of the displayed filter panels. In the alternative layout in FIG. 24, the user re-selects a prior feature, e.g. the triangle 25 in layout Z, to go back to see the features in that panel. The semcard management application also provides forward and backward arrows that allow users to navigate one step (selection) at a time back and forth.

The semcard management application enables users to save a query constructed using the filter panels, as well as other filter sequences or queries created by any other method, as a named "views"—software objects identified in the interface with a human-readable label or icon. Selecting a view (e.g. by clicking) will run the query again on whatever set of semantic objects it is applied to (i.e. its input), as selected by the user in the interface. Alternatively, a view can be set to update its result set (by running its query) on a periodic basis, or event-driven based on other events such as every time a new semcard is posted, based on standard subscription mechanims, or based on various events in remote semcard collections, such as for example those located with a remote semcard management application elsewhere on the network.

There are at least two ways to represent visually the effect of a selection of such a saved query. One is to display the full set of selected filter panels again, as they looked when the query was built. The other is to hide this path and show only the semcard set resulting from the query in the results panel. The latter may be better if the user wants to further extend the query with other subsequent sematnic filters; the former is better if he wants to modify any existing part of it. Views can be moved around in the interface as any virtual object such as contexts, and its input can be freely selected, even after it has been created, by, for example, copying a view from one context to another, or using it as an entry point.

It is worth noting that filter panels as described are not dependent on semcards; they can be applied to any set of objects with properties, as is known in the art.

A view can be shared with anyone by representing it with a semcard that is shared with other users in the way semcards are shared, via relationships.

The database component provides data storage for semcards and, can have any type of underlying database. Semcards and ontogies are stored, accessed and searched in the database component, as are credentials and encryption keys.

Finally, the semcard management application of the present invention also has Relationship Management capabilities. It allows a semcard application system user to communicate intelligently with other peers executing the semcard application system in a seamless manner. It allows users to share semcards they have created with other peers.

Semcards can represent relationships between people. On a computer-mediated network, semcards can be used to control and automate several aspects of relationship management. In the semcard management application relationships are managed via Relationship semcards. The Relationship semcard stores all information relevant to a relationship, including the parties, their permissions, and the type of automated instructions related to the relationship. The automation component manages the execution and maintenance of relationship-related rules.

A relationship establishes a virtual communications channel between the users. By default, unless a relationship is formed between the users, no communication channel between them exists and thus they cannot directly interact with one another. (An exception to this is where indirect communication can be achieved via various mechanisms, described below.)

The semcard management application is hard-coded to treat the Relationship semcard with top security. By default the Relationship semcards are non-sharable and non-cachable except through specially secure protocols.

To the user, the Relationship semcard appears as an ordinary semcard. It has the same interface as other semcards, and can be manipulated in the same way by its owner, containing links to semcards in the semcard space, facilitating navigation, including the people involved, their interaction history, interaction rules, etc.

In creating a relationship, one party, the sender, initiates its creation, by posting a relationship semcard invitation. The Invitation semcard can be made to include a unique address that enables the recipient to reply only this particular invitation, and which can be set to expire after a certain time, as well as based on various events such as the recipient trying to reply in ways which are not allowed by the Invitation semcard's policies.

The receiver has the ability to reply with an acceptance, decline, cancellation, or counter-invite. When they have been posted, semcards representing relationships can be in one or more of the following states, without being limited to this set: (a) Introduction, (b) invitation, (c) accepted or (d) declined, (e) in negotiation, (f) policy change, and (g) terminated. In all cases a reply is returned to the sender with the exception of cancellation. A counter-invitation has the choice of being accepted, declined or cancelled by the sender (there is no counter-invite to a counter-invite—the next step would be a new offer from the sender). A Relationship semcard can have a pre-built protocol that determines the transition of the semcard between these states, a set of pre-built, single-action reply per state (the equivalent of buttons), as well as an alternative free-form reply, for each state of the relationship creation.

If the recipient opts-out of the relationship, i.e. does not agree with the terms, does not reply to the invitation within its time-to-live (same as manual cancellation), or replies with a rejection, then the relationship will not have been established. The only type of semcard that can be shared in the absence of a mutually-approved consenting relationship is an Invitation semcard.

When a user targets a semcard at another party (using an e-mail address or semcard system ID/alias), for sharing or offers/requests, or alerts, the system first checks to see if the parties have an established relationship. If no relationship exists, the initiating party is first prompted to fill out an Invitation semcard. The Invitation semcard is a transaction/process semcard whose states are specific to starting and negotiating the terms of relationships. The Invitation is delivered to the other party as plain text email with a MIME attachment of the Invitation semcard, as well as an inline URL that links to an on-line hosted HTML version of the Offer semcard. If the recipient has the semcard system, they can use the MIME attachment directly. If they do not have the system, they can either download the application, or a viewer applet, or they can use the on-line HTML version. Through one of these means a receiver views the Invitation semcard to fill out.

Once they have received a relationship Invitation, they fill in their side of it, and then reply via a pre-configured button on the Relationship, which is one of "Accept", "Counter-invitation", "Decline" and "Cancel". If both sender and receiver have the semcard system, the recipient now has the Relationship semcard in their semcard management application. If they do not have the semcard system, they can access the relationship via the hosted on-line account via the included URL, regardless of whether the party has the semcard system. However, this feature may place significant limitations in terms of the number of relationships it supports, how many semcards it can store, as well as and security control.

If a relationship already exists, then the semcard system delivers the semcard according to the optimal combination of (a) relationship preferences of the recipient for how they want to receive it, and (b) the best currently available mode of delivery.

Like all semcards, Relationship semcards can be set to have a time to live (TTL), as can invitations and any step of the process of forming a relationship.

In the semcard management application one or more relationships may exists between any two semcard management application users; with any multitude of permissions, instructions and access control that applies to either party that will be stored with their one or more Relationship semcards. For example, if user A has given user B permission to view (and optionally cache on their own system) a set of semcards on A's system, and A has given a group of users, of which user B is a member, permission to view another set of semcards on A's system, then user B has access to both sets of semcards on A's system. Relationship semcards can represent any form of current Internet relationships, such as email, instant messaging, disucssion groups, etc.

By default, relationships are bi-directional. Both parties give each other access to information in their system. Policies and rules are typically agreed upon during the creation of the Relationship. However, policies can be modified by either side any time during the relationship. For such changes, the parties can decide whether the other party is notified of the changes, or gets to approve the change. In a bi-directional relationship the initiating party. (sender/inviter) always creates an invitation for a relationship.

Relationships can also be uni-directional. In a uni-directional relationship, only one party has access to another's system.

If one party in a relationship wants to change (increase or decrease) the access they have to the other party's system, they can issue a Relationship Modification Request for those changes. The owner of the system in question will then have to accept the request in order for the change to go through. The steps follow the same pattern outlined for creating relationships, with the exception that the new Relationship semcard automatically inherits all policies of the previous Relationship semcard, except for those that have been changed.

An on-line semcard application system service provides lookup for all semcard system users to allow them to make direct peer-to-peer relationships for making offers and requests. How the semcard system users discover each other can be (1) by browsing, if a party has made their contact info available on-line in human-readable and machine-readable formats; (2) by discovery via hosted on-line lookup service, using the name of other party and/or keywords or passwords exchanged between the parties, as well as (3) direct hookup between the computers via exchange of IP addresses.

In a number of cases, a semcard system user may want to make subsets of their semcards available to whoever is interested. This can be done by having a relationship with the public, which is a relationship hosted by an on-line semcard service provider. (This relationship is also the one that users use to allow anyone to post Relationship invitations to them) By setting the policies on the Public Relationship, semcard application system users can open up various parts of their semcard collection to outsiders on a pull-basis, or as the related rules prescribe.

Figure 25:
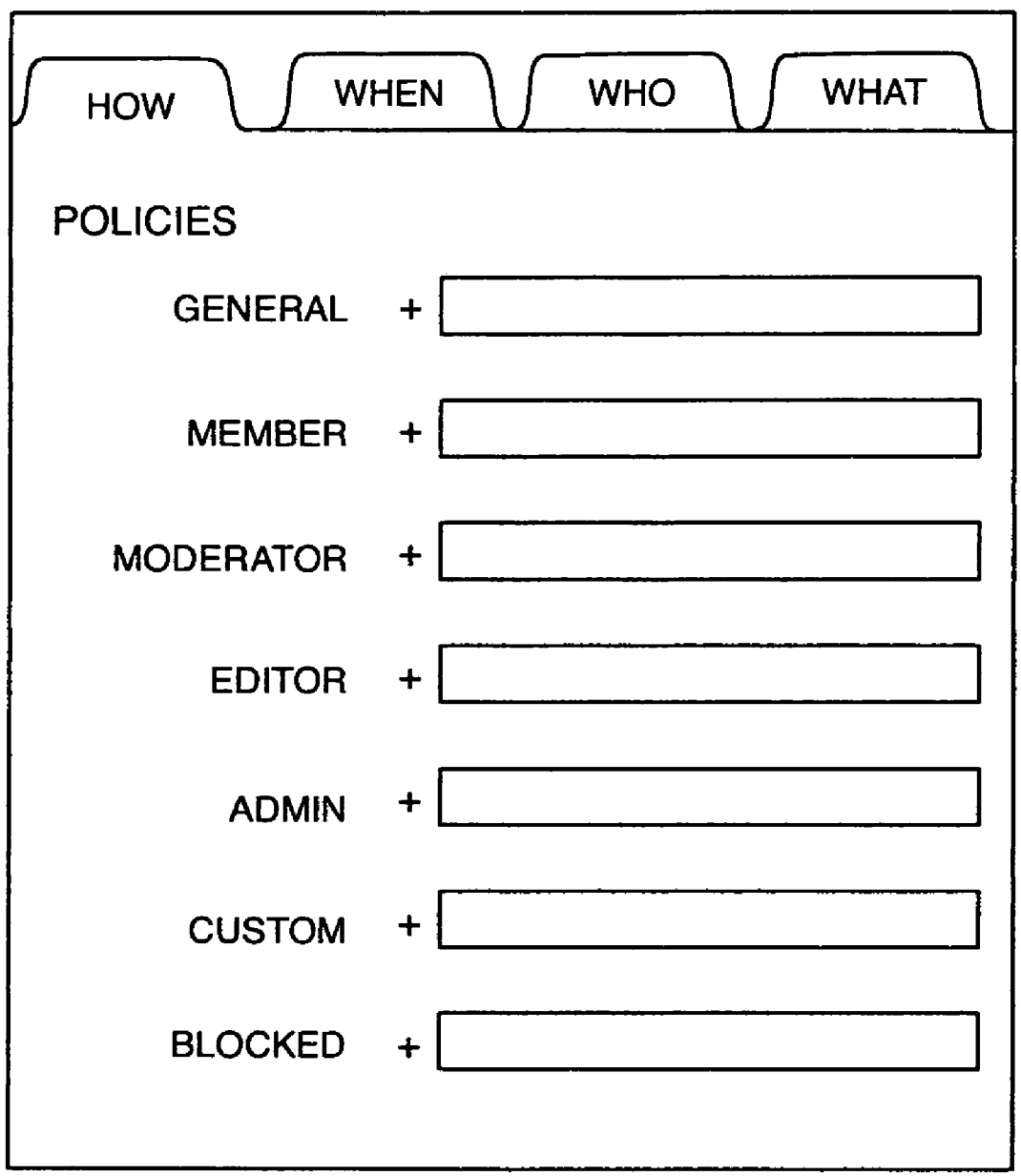
FIG. 25 is a schematic diagram showing the How tab on the Relationship semcard, allowing permissions and default policies to be set.

Setting permissions and default policies for relationships can be done via a How tab on the Relationship semcard, as shown in FIG. 25. Looking at the Who tab will bring up information about each member of the relationship, provide an overview of their permissions, and provide links to the specific details of these policies for each member. This enables one quickly to locate the policies for any member of the relationship. For example, if one wanted to change the policies for a particular member, the fastest way to do so may be to go to the Who tab, locate the person alphabetically, look at the list of policies beside their name, and click on the one which needed to be changed; this would instantly bring up the right policy for that person in the How tab.

A special section for custom rules holds extensions and shortcuts to the other rule panels. Rule semcards can be linked into this area for a quicker way to set policies for the relationship. Thus, a user could link the rule semcard for their "friends" relationship directly to a newly created relationship, to have have the rules for the new relationship be identical to their "friends" relationship.

There are two levels of rules and policies in a relationship. Level one contains the standard permissions as listed in the examples above. Level two concerns rules about the relationship itself—who can change it, cancel it, who can modify its policies after it's been created, etc.

Whitelists and blacklists are UI constructs to quickly assign global, top-level rules about sharing for any set of semcards. Furthermore, a whitelist and blacklist can be used in the system to selectively control rules for Relationships. Using a combination of semantic and fuzzy categorization, the system can classify Invitations based on the level of authentication and trustworthiness of their author.

Whitelists are a way to set global settings quickly for all members of a relationship on all general dimensions, such as caching permissions, forwarding, duplication, copying, etc.

Using semcards to hold metadata, policies, and automation instructions about a relationship, combined with a comparison mechanism as described in FIG. 25, users can control in detail: (a) Who can send them what kind of information, (b) Who can search, view, and operate on which semcards and their referents in the user's posession, (c) Automation, such as what kinds of events, initiated by people or processes with whom the user has relationships, trigger what kind of automatic system responses, (d) What kinds of services are available on one computer or account for the other party, such as caching of data, processing and matching, forwarding, (e) What kinds of notification one account should give the other. These rules can be defined hierarchically, to resolve conflicts automatically; general rules about the relationship generally take precedence over rules applying to a single incident of sharing, for example. They can also allow exceptions, by asking the users whether they want to override global rules, when a conflict is detected.

Figure 26:
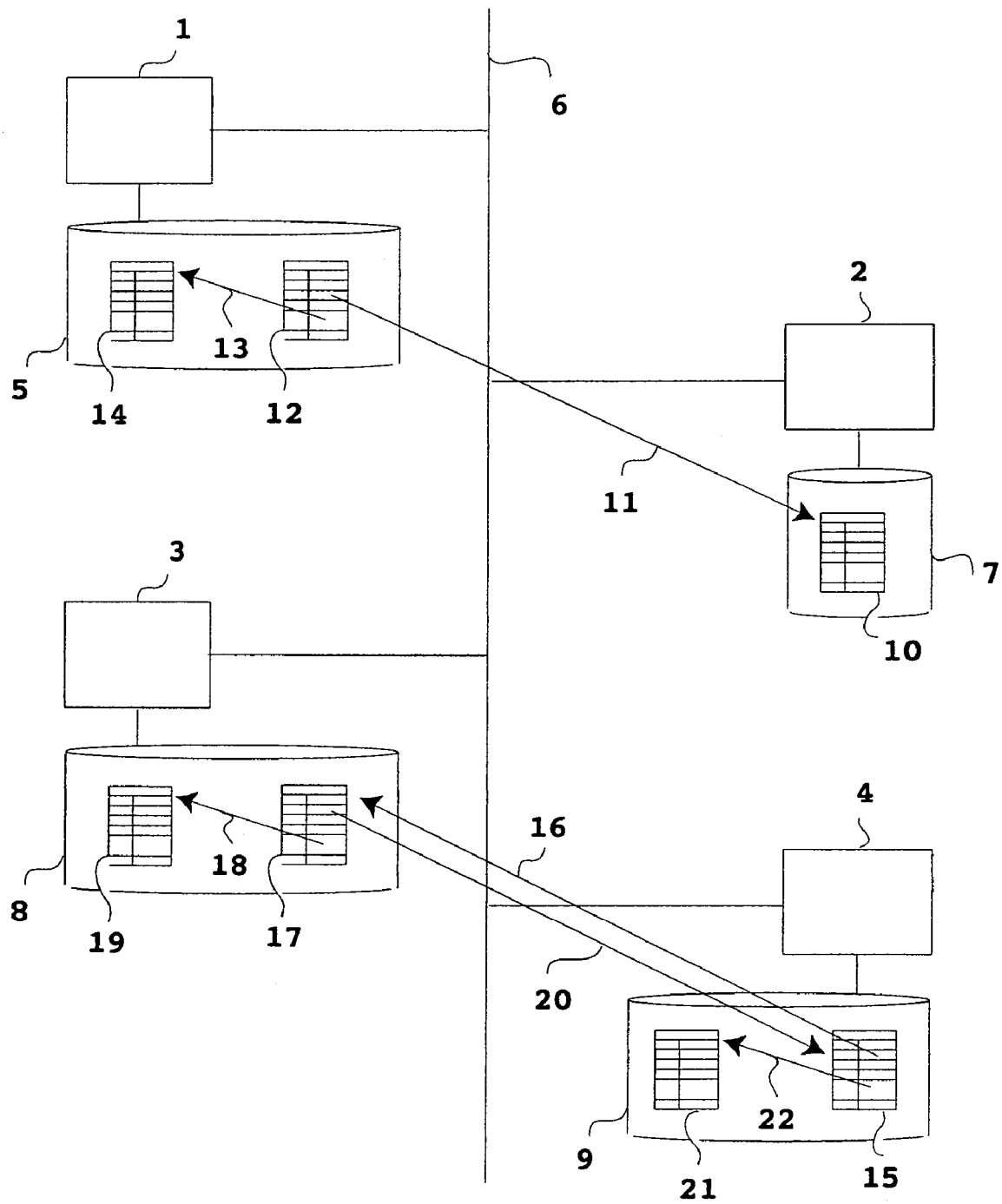
FIG. 26 is a schematic diagram of a knowledge network consisting of numerous semcard management application peers with relationships.

Referring to FIG. 26, computational devices 1, 2, 3, 4 are connected via a computer-mediated network 6. Each device has a computer-readable storage medium 5, 7, 8, 9, on which computer-readable entities and a knowledge base containing semcards is stored. Semcards 12 and 10 represent relationships. Semcard 12, owned by user A, references 11 semcard 10. Together, 12, 11, 10, represent a unidirectional relationship between owner A of semcard 12 and owner B of semcard 10, where user A has a unidirectional relationship with user B. To control this, semcard 12 references 13 semcard 14 which contains rules about what kind of semcards and data user A can send to user B. Rules in semcard 14 determine the terms of the relationship that 12 and 10 have, including those described below.

Figure 27:
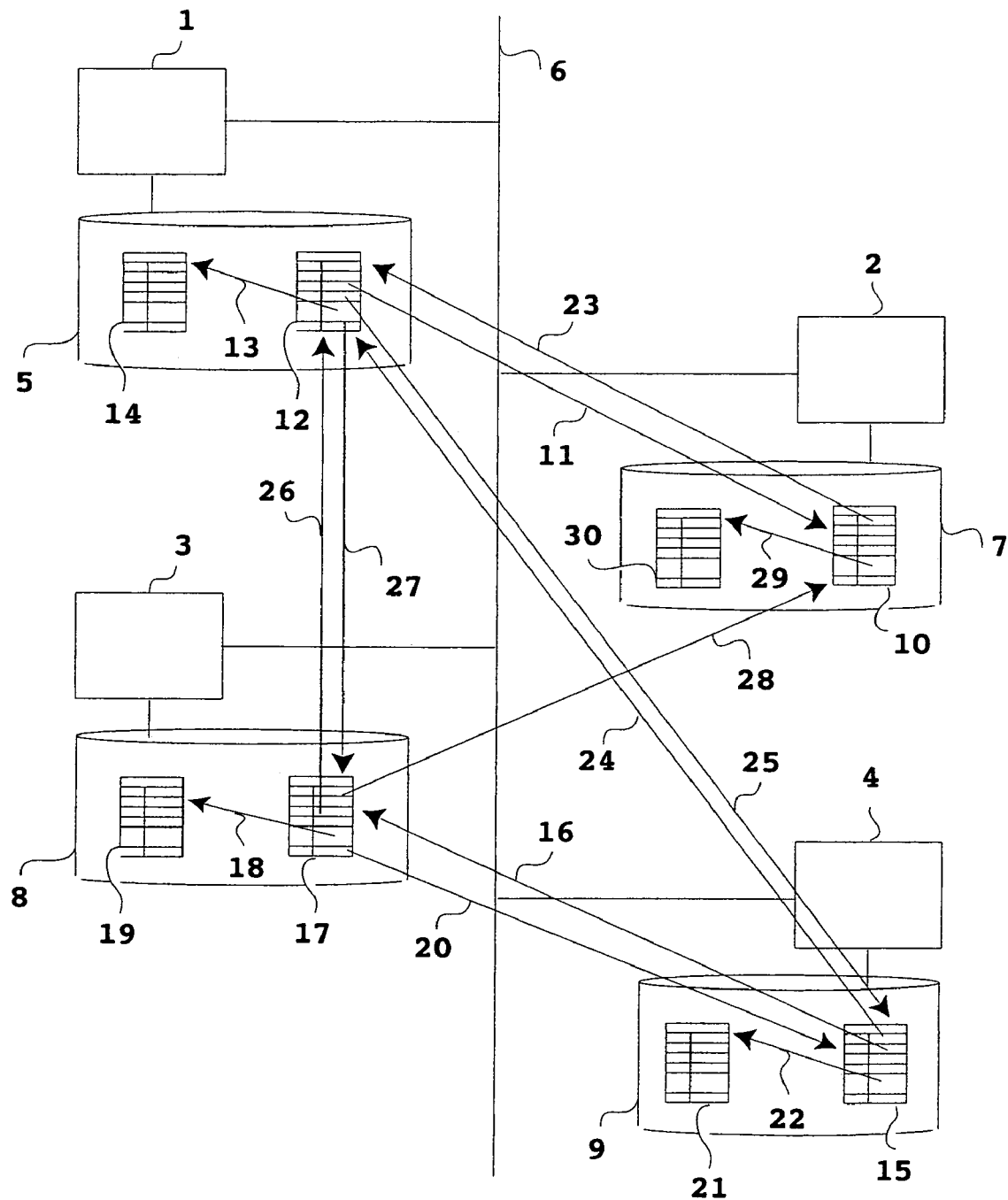
FIG. 27 is a schematic diagram extending FIG. 26, showing more complex relationships between peers.

Referring further to FIG. 27, a bi-directional relationship 16, 20, has been established between user C on device 3 and user D on device 4. Semcard 19 sets the rules (access and sharing policies, display and automation policies) about what data user C can push (post) to user D, and what kind of pull (queries, browsing) user C can do on user D's device; semcard 21 sets the same rules about D's access and permissions on C's device. In other words, semcard 19 controls whether user C can send data to user D and whether C can browse or query user D's semcards and data. Semcard 21 controls whether user D can send data to C or browse or query against C's data.

Semcards 14, 19, 21 also hold rules about relationship termination, backup, bandwidth, and other issues that pertain to each relationship, and the actions that can be supported by the system for each party.

The rules pertaining to push and pull can be replicated for each participant on the owner's peer, such that all users have a copy of the rules they have shared with the party they have a relationship with. In this case, for relationship 20, semcard 19 would hold push policies for the direction from user C to D, as before, but semcard 21 would hold a copy of these rules; rules about pull by D from C would also be stored in semcard 19, and a copy would be stored in semcard 21. This would then be replicated for the relationship direction 16. The benefits of this arrangement is that should user A violate policies on his peer regarding what he is allowed to push to user B, through a malicious act or a failure of the system, user B's peer, now receiving data from A which is not allowed to be sent to B by A, can notify B that user A is in violation of their agreed-upon relationship policies.

Multi-party, or group, relationships can also be supported using semcards. Such group relationships may be established in various ways, including the following way: Individual one-on-one relationship semcard invitations are sent from the inviter to all named parties in the proposed group. including the following way: Individual one-on-one relationship semcard invitations are sent from the inviter to all named parties in the proposed group. All messages go to the originator of the relationship—no negotiation happens between any two invitees until the originator has gotten an acceptance from both of them. In one variation of this mechanism, parties cannot communicate other types of semcards with one another, until all parties accept the terms of the group, as set by the initiator of the group. Another way of establishing groups is by using a unique ID for the group, to which any semcard can be addressed. The members of the group will then subscribe to the group (via its ID). They can put filtering on the group, such that only particular semcards reach them, as described elsewhere in the present invention.

The uni-directional relationship 11 has been extended to a bi-directional relationship 23, between the owners of semcards 12 and 10; policies 30 have been extended for controlling the relationship 23 from 7 to 6. Further, a bi-directional relationship 26, 27 has been established, making up a complete bi-directional group relationship between owners of semcards 12, 15 and 17. Alternative implementations of such group relationships, for linearly scaling to large groups, can be achieved by using servers, as described in the literature, and with the benefit of using semcards to represent such relationships. Semcard 14 has now been extended with rules pertaining to relationships 15 and 17; semcard 19 has been extended with rules pertaining to relationships 10 and 12; semcard 21 has been extended with rules pertaining to relationship 12. Further, a uni-directional relationship 28 has been established between relationship semcard 17 and 10; semcard 30 has been extended with rules pertaining to relationship 17.

A relationship can also be created by a user for some set of third parties, without including themselves in the group. In one embodiment of this system, the user sends an introduction semcard to two or more third-parties. The third parties establish a relationship according to the methods described above. In one variation, a party may only do this with other parties whom they have already established relationships, unless those parties have explicitly stated in their global relationship policies that they accept such unsolicited relationship invitations.

Relationships and introductions can be accepted or declined manually or automatically. In one embodiment, once established, if either party changes the relationship semcard in any way, relevant parties in the relationship will be notified of the change, at which time they may ignore/accept the change, or they may modify their policies or terminate the relationship if they disagree with the changes.

In one embodiment, a user may maintain more than one relationship to another user—for example they may have one relationship for "personal communications" and another for "business communications" with the same party, each with different policies, identities and addresses. In such a case, a user might terminate one of these relationships, but would still be able to interact with the other party via the remaining relationship, according to its policies, etc.

When creating a relationship, a user can choose which of their rules are visible to the other party, and which are hidden. Further, the user can decide if the hidden parts of the relationship are exported to the other party's peer or not. If they're not exported, they are more secure from unwanted exposure to the outside. However, since they can only be enforced on the owner's semcard management application peer, this means that the flow of data from the other party cannot be controlled at the source on their peer.

A user establishes relationships with other users by exchanging offers and requests for relationship Invitations semcard among user accounts. A relationship Invitation is a semcard that contains choices for responding to the invitation that encode acceptance or rejection of the proposed relationship. Only when both users to a potential relationship mutually accept relationship Invitations to one another is the relationship initiated. If the receiving party does not have the semcard peer application, the Invitation goes via regular email to them as either an HTML form, or a URL that points to a Web page where they can choose to accept or decline the invitation. Even when users have no relationship they may, however, be able to interact and share indirectly with one another via relationships they have to other uses and sequences of relationships that connect them indirectly. Once they have a direct or indirect relationship, users may then route and match offers and requests for information to one another, browse and query each other's semcards, according to access policies.

When users have a relationship they can exchange semcards of various types that serve the purpose of communication between the parties. For example, a user can fill out a semcard called "note" and address it to a party with which they have a relationship, replicating the functionalities of email, but with the full benefits that semcards, Relationship semcards, and the semcard management application provide. Further, users may specify the mechanism by which the recipient of such communication should be notified—whether by a pop-up message, a "flag", sound, or by other means. They can also specify the urgency of such notification, such that the recipient's semcard management application can apply rules as to how best to notify the recipient of the communication. Policies of the sender will specify (a) the preferred default way of notifying the other party of communicative actions (and, in fact, of any sharing event or other communicative event on the relationship), and (b) what the rules are for various urgency levels selected for such events. The recipient may have specific rules for the relationship about what kind of events thus specified by the sender are allowed to be followed on their side. This is mirrored for any interaction in the other direction. Global rules may also be set for all relationships, or specific groups of relationhips.

An extention of this design relates to instant messaging between the two parties. Rules about when each can be accessed, when they are listed as being "available" for chatting, etc., can both be set per relationship as well as globally for groups of relationsihps or all relationships.

The system of the present invention is capable of intelligent matching of offers and requests, involving all types of knowledge: Information, ideas, suggestions, opinions, products, services, jobs, events, people, skills, etc., using semcards and semcard-like structures, creating a bi-directional marketplace on the Internet. The invention enables parties to search and do marketing in the same way, in the same environment. This reduces the complexity of finding matches to offers and requests, which often involves both searching for others and marketing so that others can search for you. The system also helps providers search for seekers who want what they offer and enables "reverse search", a bi-directional network is created, doubling the utility of the uni-directional nature of the Internet for these purposes, as described earlier.

Semcards, and knowledge networks, can be designated as being offers or requests on a computer network, for various purposes, including (a) advertising, (b) offering of merchandise, or (c) finding or procuring items. This can be done in at least four different ways: If a single semcard is being offered/requested, metatags in the offered/requested semcard contains the offer/request metadata. If a single semcard or a knowledge network is being offered/requested, a separate semcard can hold the offer/request metadata. In the latter case, the separate semcard can either wrap the offered/requested semcard or knowledge network, or refer to the semcard or knowledge network using one or more reference pointers.

Offers and requests are thus semcards or similar-structured software objects, comprised of meta-data that defines the attributes of the particulars regarding the offers and requests they represent, and where the payload describes what is offered or requested, such as jobs, resumes, opportunities, products, services, etc. Users can manually create offers and requests for things using the system user interface. In particular this can be useful when representing things that have no electronic substance, such as ideas or things that are not represented by documents or files on a computer.

Parties create forms by selecting the appropriate form templates from a directory of alternative form templates for various purposes and then fill out the relevant parts of the semcard, optionally linking them to other semcards and/or target reference, and post them to the network. There are at least two types of addressing a semcard that enable both "direct" and "indirect" targeting or routing, for purposes of sharing, or offers, requests, invitations, and other types of targeted—or goal-directed—semcards. With direct targeting a semcard is sent to explicitly named recipients with which the semcard's author has an existing relationship. With indirect targeting, on the other hand, a semcard is sent to recipients who satisfy various criteria. An offer or request can be targeted to selected parties, loosely-defined on-line groups of users, or to public forums. These targeted recipients can be defined in a fuzzy manner, using a matching engine to determine the level of relevance of the offer/request to any party encountered, using matching mechanisms described below. Indirect targeting is useful for reaching unknown parties who are interested in a particular topic. Using these methods, the target audience can be defined as specifically or generally as desired by the sender.

When the semcard has been specified to the user's satisfaction it can be test-posted. Test-posting provides an estimate of how many matches may occur, how much the posting may cost, etc. The user may then tune the semcard's goals policies to refine it based on this estimate before posting it. Users may repeatedly refine and test-post until they are satisfied.

Another more advanced option is to have an on-line service evolve an optimal semcard or set of semcards for a particular campaign. In this mode, the user provides some example semcards that represent their goals and the on-line service will use various algorithms to evolve and repeatedly test-post generations of similar semcards to arrive at a semcard specification that has optimal price-performance attributes. This semcard can then be posted by the user.

When an offer or request has been posted, it is routed over the network in various ways, depending on what kind of semcard it is. Using semantic routing, for example, semcards that represent offers, requests, and queries, can be routed semantically between nodes on the network. Using peer-to-peer routing, direct relationships can be leveraged to send sharing policies, notifications, alerts, and messages.

Figure 28:
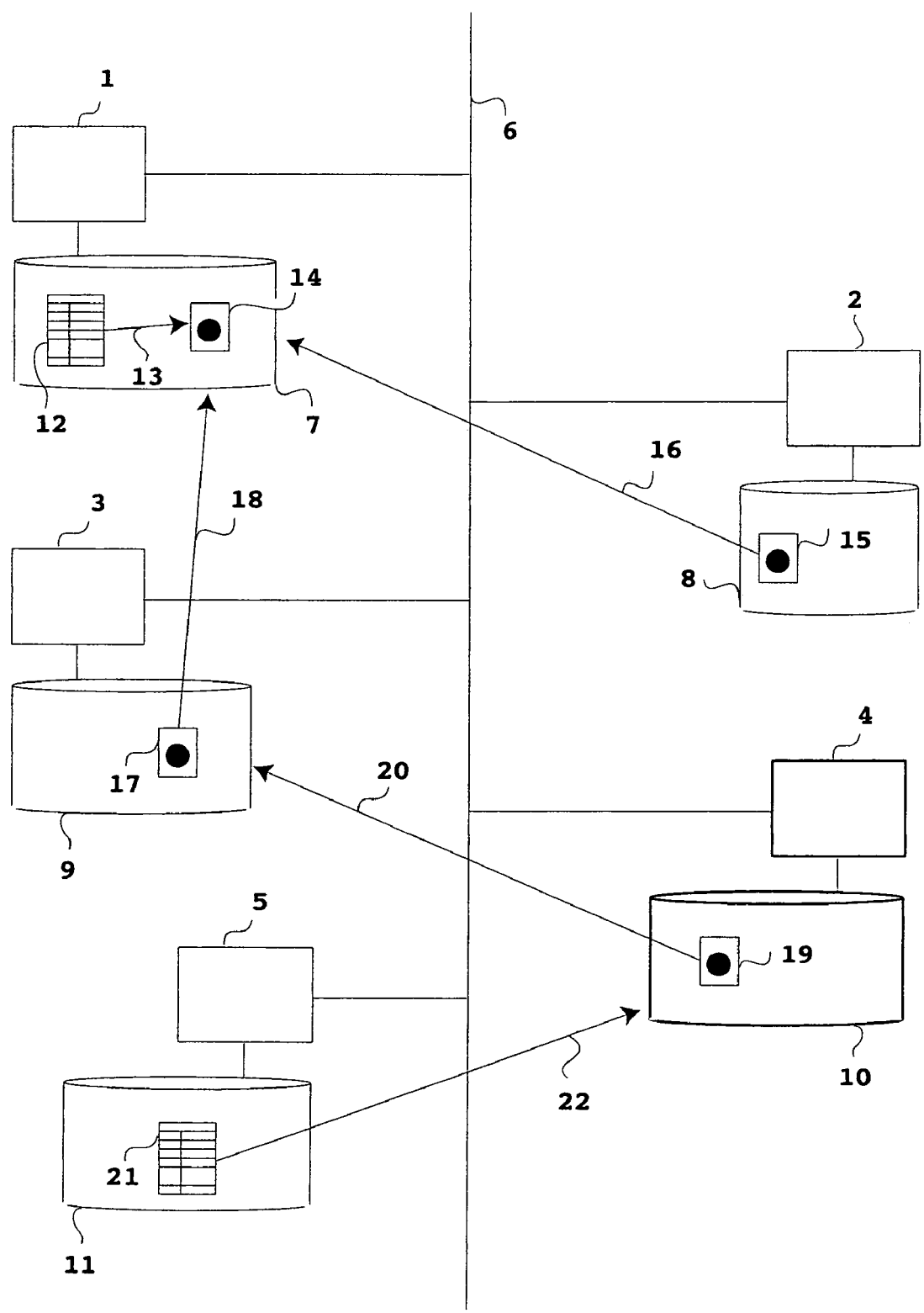
FIG. 28 is a schematic diagram showing routing of semcards using servers in a peer-to-peer network.

Referring to FIG. 28, computational devices 1, 2, 3, 4, 5 are connected via a computer network 6. Each device has a computer readable medium, on wich semcards are stored 7, 8, 9, 10, 11. A semcard 11 is used to produce 13 a routing profile 14. The routing profile describes salient features of the semcard, as detailed as deemed necessary for supporting efficient routing of semcards. The routing profile 14 is propagated to other computers on the network 2, 3, 4, and stored on their computer-manipulatable storage media 8, 9, 10.

The profile does not necessarily point directly to the original home semcard from which the routing profile was generated; a copy 19 of the original routing profile 14 may point 20 to the node 9 from which it received the routing profile, as described in the art.

The routing profiles 15, 17, 19 serve as pointers 16, 18, 20 in the direction of the node 1, 7 that hosts the semcard 12 from which the original profile 14 was generated. If the original semcard 12 represented an offer for something, the routing profile will also represent this fact, and specify that it can match to requests for its metadata. When user of computing device 5 creates a semcard 21 that represents a request containing metadata that matches the original semcard 12, a request semcard will be routed 22 to the nearest node 4, 10 on the network. If the receiving node 4, 10, contains a routing profile that matches the semcard's 21, it will route it to the node 9 to which the routing profile 19 points 20.

Figure 29:
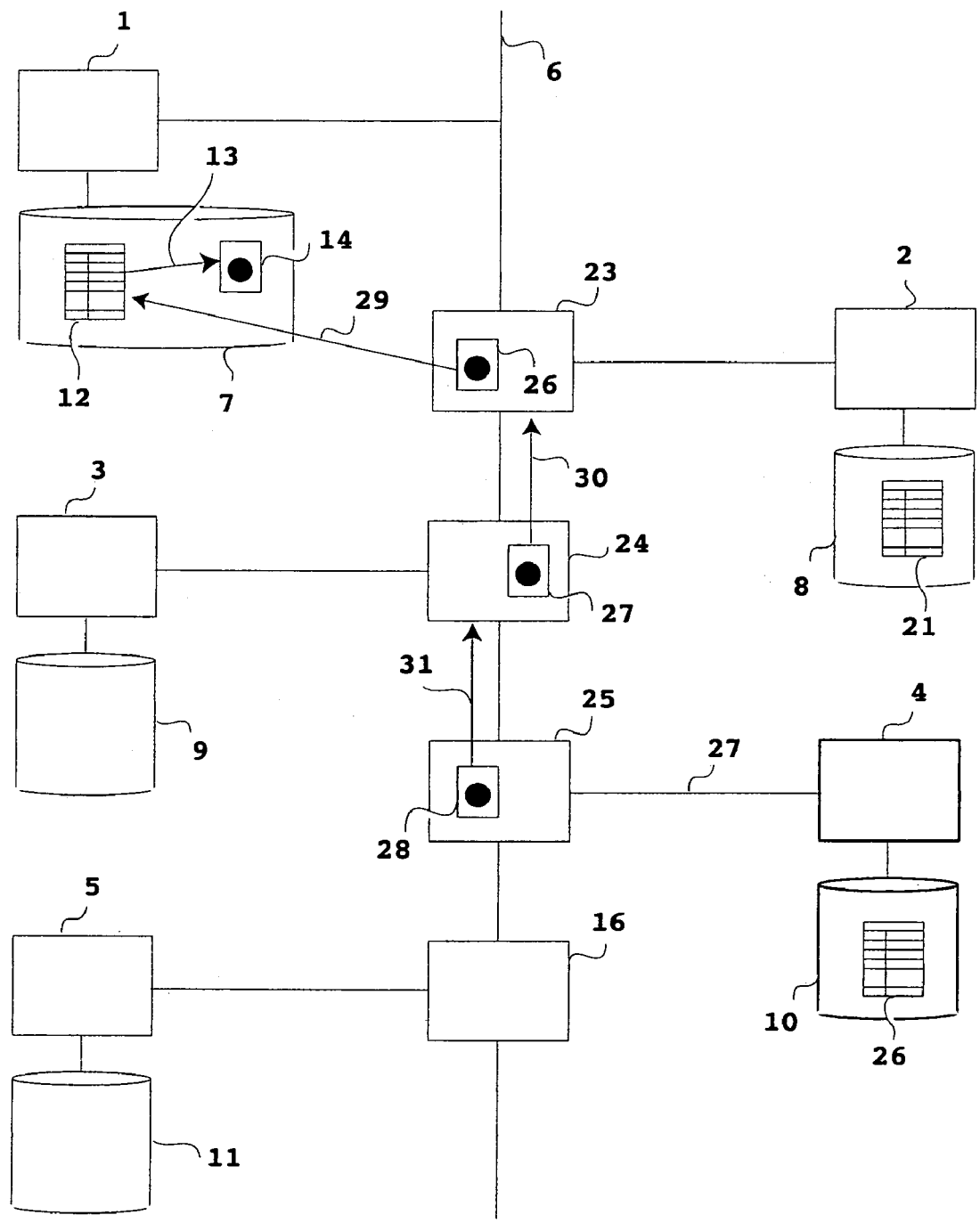
FIG. 29 is a schematic diagram showing routing of semcards using servers in a network of peers and servers.

Semcards can be routed using the same principle in a network with dedicated routers. Referring to FIG. 29, computational devices 1, 2, 3, 4, 5 are connected via a computer network 6. Each device has a computer readable medium 7, 8, 9, 10, 11, on wich semcards are stored. A semcard 12 from which is produced 13 a routing profile 14. The routing profile is propagated 27, 28, 29 to the routers on the network 24, 25, 26. In the same manner as before, a copy of the semcard which is posted/published onto the network travels on the network 33 to the nearest router 26, at which point the router forwards the semcard to the closest router, and so on, until it arrives at the node 1, 7 where it was requested.

As explained in the art, two or more routing profiles can be aggregated and compressed, to represent thousands of them in a single table. A routing table is an aggregation of two or more routing profiles, degraded in specificity based on the distance to the home knowledge base whose data it represents. This can also be done with semcard routing profiles. Each routing table would contain partially aggregated and partially or fully compressed interest profile of downstream semcards. Semcards representing offers and requests are passed on by routers to nearby routers that have relevant interests, in a decentralized manner, until they reach edge-nodes where their content has been requested or is needed.

Routing tables can be propagated via semcard relationships, as can published offers and requests which are routed based on the routing tables.

When semcards have been routed to a recipient node or semcard deemed worthy of matching against, matching processes such as agents, scripts or programs, can compare pairs of semcards to determine the level of match between them. Such processes work continuously on behalf of seekers and providers, enabling them to go off and work on other things until matches are found. The system understands the meaning of offers and requests and eliminates irrelevant search results by semantically matching them to each other. If seekers wants to find "rock," they can directly tell the system whether they mean "rock music" or "rocks and minerals," which the system subsequently understands and can make use of.

Semcards can be compared on their slots, both semantic dimensions and values. Such comparison can be used for various purposes, including (a) routing, (b) matching, (c) one-of searching/querying/browsing, (d) standing offers/requests, (e) filtering, and (f) inferencing.

Figure 30:
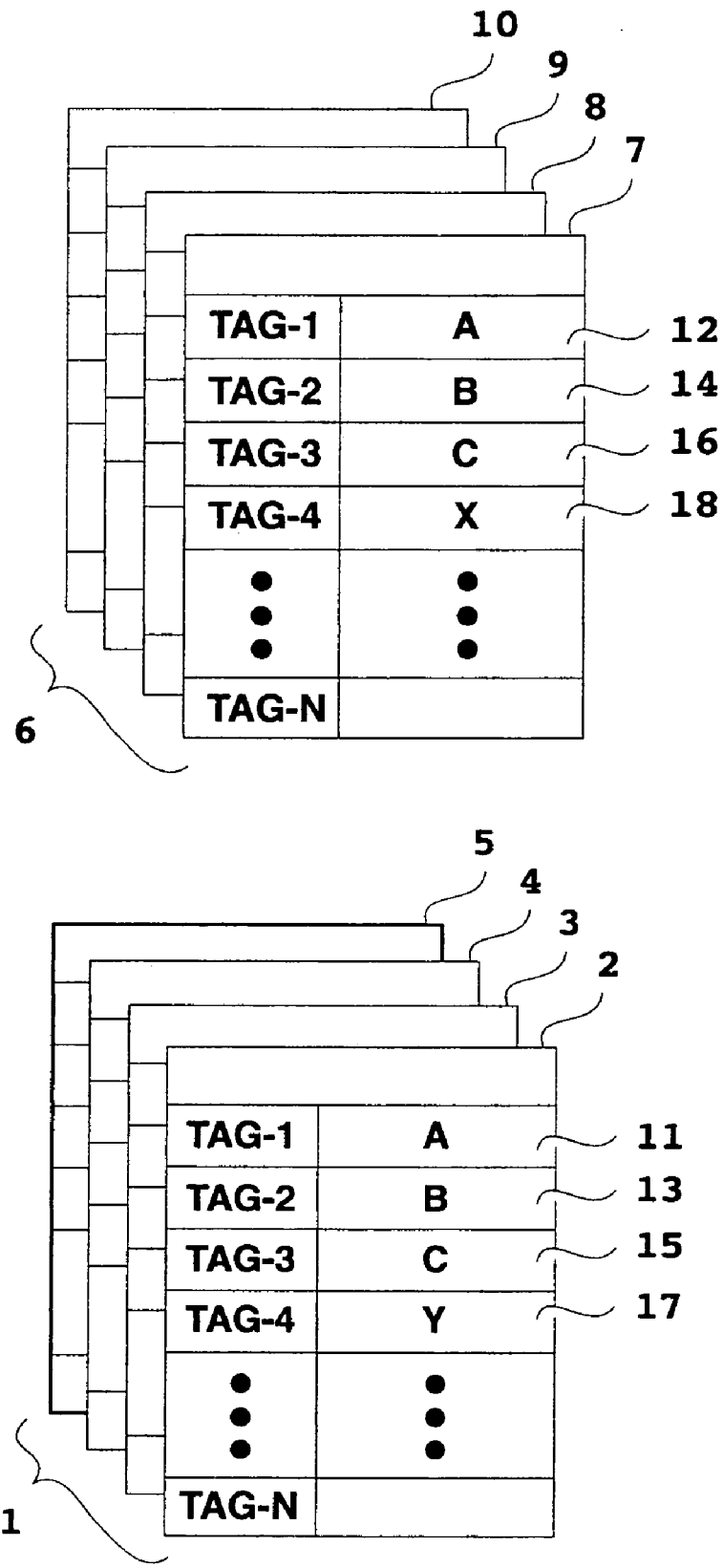
FIG. 30 is a schematic diagram of matching mechanisms used on semcards.

Referring to FIG. 30, semcard 1 composed of four parts 2, 3, 4, 5, each segment containing a set of meta-tags and meta-data, and another semcard 6 composed of four parts 7, 8, 9, 10, the parts being for example a basic specification, a display specification, a policy specification, and an automation specification, each containing metatags and meta-data 12, 14, 16, 18 in semcard 6 and 11, 13, 15, 17 in semcard 1. The size or complexity of a semcard can vary. Comparison between two or more semcards can proceed in two steps, the first step comparing their metatags, and a second step comparing their metadata.

Figure 31:
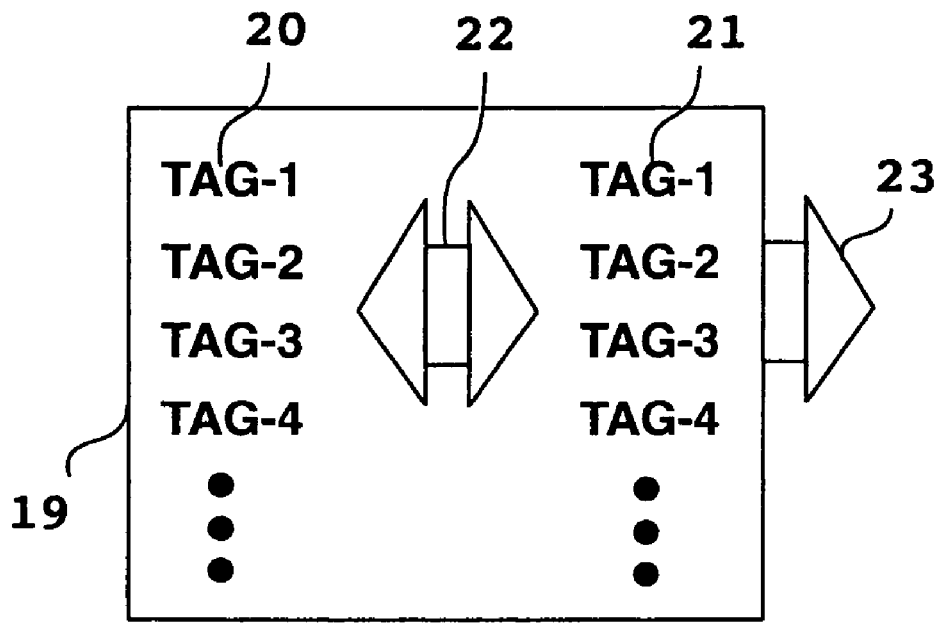
FIG. 31 is a schematic diagram showing details of matching two semcards.
Figure 31:
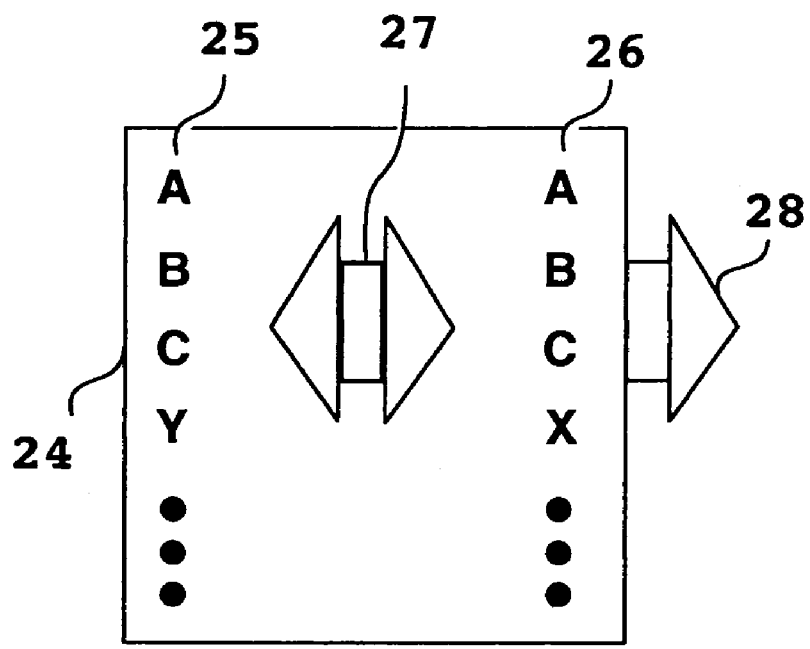

Referring to FIG. 31, shown are the meta-tags 20 of a first semcard and the meta-tags 21 of a second semcard, compared or matched in a comparison module 19, using a plurality of comparison algorithms 22, providing an output 23 of the similarity between the meta-tags of the two semcards. The second step, comprising metadata 25 of the first semcard and the corresponding metadata 26 of the second semcard, and a comparison of these in a comparison module 24, using a plurality of comparison algorithms 27, provides an output 28 of the similarity between the metadata of two semcards. The output 23 of the first comparison module 19 provides a separate result for each meta-tag, and enables the next step in comparison module 24 to be done more intelligently.

An offer, request or other semcard which is designated to be matched to other compatible semcards, has associated policies which determine how the matching should be done. In one alternative, only metadata whose metatags are identical between the compared semcards, are compared in the second step. In another alternative, a continuous measure of distance (difference) is used, in combination with a threshold, is used to determine if metadata for each metatag should be compared; if the distance metric is larger than the threshold, the metadata for that metatag is not compared. Both meta tags and meta-data can be compared using an ontology, if they are defined using one. However, even if only meta-tags, or neither meta-tags nor meta-data, are defined using an ontology, comparison can still be performed, using different methods, which include string comparison, synonym comparison, or other such comparison mechanisms as described in the art.

Matching or comparing a collection of semcards, i.e. a knowledge network, is an extension of the above principles. In its simplest form, each object in the collection is compared to each object in the other collection, and the number of exact matches is counted and used as a direct measure of similarity. A more advanced embodiment of this includes using e.g. an ontology or taxonomy to generalize the type of object, for example, if an object of type dog is compared to an object called animal, and their relationship can be determined by the use of one or more ontologies, or by some other means, the similarity measure does not simply mark them as dissimilar, but calculates a measure that represents the distance between the two objects and their meta-tags and meta-data. Even though the semcard of type animal may be different from the one of type dog in many ways, dog is a subtype of animal, and thus will have more similarities than a dog and a table. Another embodiment could ignore the type alltogether and compare a dog and a table semcard by first comparing their semantic dimensions, both of which may contain the meta-tag "number-of-legs", which may contain the value four. In this scheme, the similarity between a millipede and a table may be judged to be less than the similarity between a dog and a table, if "number-of-legs" is one of a few semantic dimensions being compared, because both a dog and a table have four legs.

Knowledge networks that is offered can be represented by a collection of Offer semcards, a single Offer semcard, or a compound hierarchy of Offer semcards, where the network is described at various levels. In this last case the matching algorithms "know" about the network's structure, and can match intelligently to requests for various parts of the network as well as the whole network.

Typically, offers are matched to requests and requests are matched to offers. It is also possible to offer requests, and request offers, making it possible to distribute collections of such semcards in one go. In a routing network, whether peer-to-peer, client-server, semantic, other type of network, or some hybrid, a subscription is represented as (a stationary) routing table entry that typically lives on a particular server; a publication is routed in the network—i.e. it travels to wherever there are stationary relevant subscriptions. An offer or request can be posted either as a subscription, a publication, or both. The decision as to which of these is used for any instance of a posted semcard can be made based, among other criteria, on (a) relative frequency of offers vs. requests, (b) network bandwidth, (c) computing power of the computational devices on the network, etc., and it can be made dynamically and automatically by the system based on various states of the network at different times, or hard-wired into the network and routing mechanisms.

There are thus three different matching combinations for published and subscribed offers and requests: (a) published offer and subscribed request, (c) published request and subscribed offer, (c) a combination of options (a) and (b). The first represents the traditional situation where people are matched up if one of them has something to offer and one has something to request, where requests are stationary subscriptions and offers are published onto the network. Option (b) is the inverse equivalent of (a). For any network, a decision has to be made whether either options (a) or (b) are hard-wired into the network design. The subscription is typically offers more security because the semcard itself is only propagated anonymously into the routing tables, so the choice of this option may actually also be left to the user. In such a system offers and requests can be either publications or subscriptions. Of course, should the user choose to post an offer as a subscription in such a network, the user will only get matches on requests that are publications, hence reducing the potential number of resulting matches. Alternatively, option "c" makes it possible to choose both. The choice as to the network design can be made based on several criteria, including but not limited to (a) security requirements of the network, (b) available bandwidth (network and computing power), and (c) desired simplicity (doing both is more complex).

Once matches are found, various further activities may then take place according to the specifications of the matched users or parties. For example, one or both users may be notified or they may receive the matching form, or manual or automated activities may take place to transfer files, buy or sell things, reply to one another, forward messages to other parties, launch external applications, etc. These further "follow-up" activities can be manually initiated and completed by users, or they can be automated by software agents, scripts or programs attached to user accounts and/or to particular relationships, offers or requests. The system's automation processes can follow up on tasks, according to the rules specified for the offer or request by their authors, allowing automatic processess to respond, issue alerts and notifications, transfer files, make or accept payments, etc., on their behalf. The automation processes can also help the matched parties communicate by facilitating anonymous or authenticated interactions.

Identity or the authenticated person in the semcard is typically stored as either encrypted or non-encrypted data. The identity section in a semcard has four parts:
1. The author of the semcard
2. Recipients of the semcard
3. Parties who have rated the semcard
4. Parties who have annotated the semcard If the semcard is an offer or request, this information is added:
5. Parties that have matched and have been notified about the semcard Each of these can be hidden or revealed based on the semcard policies as shown below.

SEMCARD
Goal:
  Offer
  Request
  Alert
  Invitation
  Other
If offer or request, match to:
  Other offers of type [default: same as this]
  Other requests of type [default: same as this]
Security level: [high] [medium] [low] [custom] Encrypted:
  Yes [how] [level]
  No
  Escrow:
  Yes
  No
Network transport:
  Subscription (stays on node)
  Offer (travels on network)
  Both
Notification:
  Sender
  Recipient
  Both
  Either
  Neither
Authentication:
  Sender
  Recipient
  Both
  Neither
  Either
Anonymity
  Sender
  Recipient
  Both
  Neither
  Either As mentioned above, the decision about when and how to contact two parties of a matching offer and request is based on the rules and policies of the two semcards. Rules can be specified for every part of the process. The rules also dictate the matching process. For example, rules may include how exact or flizzy the matching should be for each field, field priorities, which fields are required to be matched for notification to occur, how notification should be handled, what kind of user authentication is required for a match to occur, how the semcard author's identity should be hidden or revealed to matched parties, etc. Available policies include:
Notification
Matching
Payment terms and policies
Sponsorship terms and policies
Identity
Privacy
Certification or Authentication
Security policies
Reply policies
Browsability
Receipts
Payment terms and conditions
Billing terms and conditions A price can be attached to the launching of a semcard; the price represents a function of the system-cost in routing and matching the semcard. Depending on the particular service, this price may be passed on to users by requiring cash payments, or it may be absorbed or subsidized by the provider or advertisers, etc.

If users cannot find a semcard template that suits their needs for describing what they want to represent, they can extend the templates already provided, or create new ones that inherit from the ontology defining the current templates. They can subsequently submit such extensions to local semcard-capable servers, or to a central semcard ontology repository. Such central repositories keep track of the most popular forms for describing various things in the world with semcards. Such repositories can provide semcard management application users with a list of the most popular semcards for representing various concepts in the world. The statistics are received by virtue of linking to other such servers, such servers keeping track of the number of people submitting various types of semcards. (Semcard similarity is computed using a matching engine, as described above.) The consolidation feature enables the system (or the end-user) to take all the fields from all the various alternative templates for a node and rank them in terms of (a) the number of active postings in the system that use such a field, or (b) the number of active opposite postings (if the post is an offer, then the opposite postings are requests) that seek that field). Then the system creates a consolidated form containing all the most important fields from all the best alternative forms for that node (e.g. Job Offer), but ranked in terms of popularity. Thus the first dozen or so fields are probably the most widely used by users of the system. This enables a user to fill out the consolidated form instead of just one particular form, choosing the most popular fields to fill out from among all the fields being used in all alternative form templates for the node, and this will give them maximal compatibility and reach. Once users have created new semcard templates, or extended the ontology, they can share such extensions with each other using semcards representing semcard templates and ontology branches or whole ontologies.

The marketplace system of the present invention makes matching more efficient by enabling seekers and providers to cooperate in finding one another, under a unified framework that fits into the semcard management application and the semcard framework (but can also be implemented separately through alternative solutions). By sharing the work, both parties (and the computers of both parties) can share the workload for the necessary transactions, making interations more balanced. This fundamental process can improve a variety of processes, including:

Team & enterprise portals
Search
Classified advertising
Permission-based direct marketing
Personalized content distribution
Personalized commerce and shopping
Online marketplaces
Industry exchanges
Knowledge management
Procurement
Supply-chain integration
Customer relationship management (CRM)
Communities-of-interest
Communities-of-practice In the context of marketplaces, there are several features that make the marketplace more powerful, as will now be described. These features may also be used in other circumstances besides marketplaces.

The semcard management application provides a mechanism for rating the quality and reputation of content in the semcard management application network and any knowledge network. Every semcard, Relationship semcard, as well as every group relationship, community relationship, and persona semcards, may have ratings associated with it. This enables collaborative filtering, networks of trust, and reputation filtering to take place on the network.

Any semcard management application can have one or more accounts, each one owned by a particular individual or group; each account can have serveral "personas"—templates that dictate the terms of relationships that its user has with others. The user of an account with multiple personas can be given a rating that is a function of the ratings of all its personas as given to it by those with whom he has relationships, or the cumulated ratings given by others of all its posted semcards. Since the ratings of person A by person B is owned by person B, person A has no control over the rating. The same holds for ratings of semcards: A rating by person A of semcard C, where semcard C is owned by person A, is not modifyable by person A. Since all semcards have a unique ID, and all users are represented by persona semcards, this creates a system where communities of users can use ratings to control rogue individuals in the network.

A further extenesion of the utility of this mechanism is provided where a person is represented by their account, allowing the cumulated ratings of their Persona semcards to be reflected back on the account itself, and thus their actual identity, providing a community a further mechanism to suppress unwanted behavior on the network.

A posting receives a starting rating that is a function of the rating of its Persona designated as the semcard's author. Any rating given is affected by the rating of the rater—this way people with higher rating have a larger say than people with lower/worse ratings on the network. The longer an account has been active on the network the more a new persona created by the account owner will inherit the account's rating from the start. This will benefit those that have an account with a high rating and discourage those whose account has a low rating.

A user can rate any semcard and relationship along several dimensions. This includes:

1) Match quality—was the match a good one? Is the matched semcard useful for what it sets out to do?
2) Usefulness—how sensible is the match in the user's given context?
3) Appropriateness of language
4) Quality of matched semcard—how well/appropriately was it specified?
5) Endorsements, with annotation A semcard/ontology designer can also add custom rating fields to a matching pair of semcard types. A taxonomy of standard rating scales in the system would be provided, however, users and communities can create their own additional custom ratings.

These ratings enter into the overall rating of a matched pair of semcards, as well as its posting party, and the account (persona) of the posting party. When viewing or interacting with a semcard, parties and users can take these ratings into account.

Parties can also rate their experience with other users, including how satisfied they are with follow-up, if the matched parties have corresponded. Typically users will fill this in if they are not satisfied or have a complaint.

Each party that rates can add a free-text comment. Their ratings for the post, as well as their current persona ratings and statistics about their general rating pattern, are summarized at the header of their comment. The receiving party is allowed to reply and they can debate in a thread if they wish. This provides some checks and balances to ratings. There is a policy for acceptable conduct in comments. If that policy is violated, such as use of profane language, comments will be deleted and the violator will be penalizedon their persona ratings.

Forwarding is a function of the semcard management application, where an owner posts a semcard to another user that he himself received from someone else. In direct manual forwarding semcard is forwarded manually, with no new policies. Semcards can be forwarded from one recipient to another, either directly or indirectly, as described below in addressing methods, as well as manually or automatically. Automatic forwarding means that the account has forwarding rules that posts particular semcards to other recipients; manual forwarding means this is done manually for each semcard.

When a semcard is forwarded it is wrapped in a second semcard which contains additional information, such as who forwarded, their rating, reasons for forwarding, rules (if forwarded by rules), etc. The forwarding party may mask some original links and references with intermediate links and references, only to be traced back via the forwarding party, potentially being subject to policies set by the forwarding party.

Another mechanism is semcard brokering. In the case of brokered semcards the originator of a semcard is not visible to the ultimate receiving party with whom there is a match; the brokering party acts as a middleman for interactions resulting from a match between two semcards. To take an example, when two users receive a notification that their semcards matched, they cannot reply directly to eachother, rather, they reply to the brokering party, who in turn relays their replies to each other.

The broker can set policies that restrict ensuing activity. For example, she may opt to be cc'd on all subsequent communications between the brokered parties, and she may opt to have all communications between the parties go through her, with or without moderation. She can also restrict the types of matching that can occur, and the types of follow-up that are allowed.

In brokered situations, semcards inherit the rating of the brokering post. This way, semcards inherit any ratings from bad brokers, which allows agencies to create filters that block semcards and/or agencies with bad ratings semcard brokering has features to manage accountability, trace referral history, and transfer funds related to the referrals and resulting matches.

Brokering differs from forwarding in that forwarding cuts the forwarding party out of any subsequent transactions related to that semcard; brokering obligates the receiver to follow policies that the forwarding party sets on the forwarded semcard. Also, in brokering mode, the broker may benefit from any payment policies in the semcard. Semcard brokering, in contast to forwarding, has features to manage accountability, trace referral history, and transfer funds related to the referrals and resulting matches.

For example, a user may see or receive a job offer and wish to refer it to a friend who is looking for work. The receiving party may do whatever they want with the semcard: match it, respond to it, delete it, and store it.

There are several ways to advertise in a network of semcard management applications. The simplest way is to fill out an Offer semcard of type "advertisement" and post it to anyone who wants to get it that matches the targeting and policies of the advertisement. Another way is to embed or attach an ad semcard to another semcard, so that the ad semcard always travels with it. However, the semcard management application provides two other, ways of advertising using the idea of an "ad stream".

An ad stream provider can publish a semcard of type "Advertising Stream Offer" to content providers who subscribe to the ad stream. The ad stream semcard contains meta-data about the content of the ad stream, i.e., the type of ad, the intended audience, how long the stream will run and/or how many ads and impressions per ad are allocated to it, and what will be paid for each impression and each click to parties who run the stream.

Content providers can subscribe for appropriate potential ad streams to run in their sites. Content providers who match may then reply to the ad stream publisher with an application to receive the ad stream. The publisher can reply to the content providers with a custom URL for them to run on their ad slot of their Web site. The URL includes an encrypted ID for the stream and an ID for the content provider. The content provider then runs the URL in its site's ad slots.

Visitors to the content provider's sites cause an ad to be pulled from that URL (which refers to the ad stream provider's ad server). Their ad server sees the ID of the semcard the ad stream came from and the ID of the site that pulled it and awards points to that site's account via the semcard management application to compensate them for running the ad stream. Subscriptions to certain types of semcards also create subscriptions to certain classes of ad streams. In other words, the targeting that is used to define a subscription is valuable for also targeting relevant ads to that subscriber.

For instance, a subscriber has a subscription to get offers for sports cars. When they make the subscription, it also automatically makes a subscription for ad streams that are targeted to people interested in sports cars. Certain classes of offers and requests contain slots for running ads in the content of the envelope when it is displayed to the user. (In other words, they contain a slot for a URL that pulls from an ad stream.) To take a specific example, when envelopes with sports car offers are matched to the sports car subscription for that account, advertisements are automatically added to them depending on how they are being viewed:

1) If the sports car offer semcard is being viewed as HTML, an ad stream URL is inserted into the ad slot in the content. This causes the appropriate ad to be pulled from the ad stream provider and run in the content.

2) If the sports car offer semcard is being sent out to a fax machine, or to SMS, etc., the system either puts a TIFF image of the ad into the TIFF being faxed out, or it puts a text version of the ad into the SMS message, etc.

Thus, the particular ad and the format of the ad are not decided until the ad is received and/or displayed by a subscriber.

Furthermore, it is also possible to run ads on email and other types of messages. These ads subsidize the price of sending the messages. If users do not want ads on their messages, they can spend points to buy the ad space. Ad-free viewing can be paid up-front by the sender of a message or by the receiving party (if either one pays for no ads, the other does not have to pay, even though their settings are set up to filter out ads.)

Users of the semcard network can also buy ad space, either from a local node owner (or from the owner of a central node in the network) and run their own ads in it. To profit they have to charge their advertisers more than they paid for the ad space, creating a marketplace for ad space. So, for example, an advertiser buys the ad space on a message semcard that he is sending out to 100 people who are interested in motorcycles. He pays ten cents up front for the ad space on those messages. He resells the ad space to a third party for ($0.003/impression) grossing him 30 cents, and thus a net profit of 20 cents.

The semcards' unique ID allows the system to track each semcard as it travels on the network Network nodes or semcard management applications can thus be automatically mined for top trends, topics, articles, resources, etc., which can also be encapsulated as knowledge in semcard and published back to users or central service.

The semcard management application provides an API for useful real-time information about semcard activity in the network. All calculations are based on raw data from the system events:

1. Posting a semcard
2. Receiving a semcard
3. Storing a semcard
4. Matching semcards
5. Splitting a semcard
6. Combining a semcard
7. Transmitting (routing) a semcard
8. Delaying the transmission of a semcard
9. Delaying transmission of parts of a semcard
10. Reliability of nodes
11. Efficiency of nodes
12. Displaying a semcard (e.g. browsable, or visible)
13. Ratings of a semcard or user account In addition, statistics about the following (and more) can be recorded:

1. the type of semcards received and posted
2. semcards encapsulated in routing tables 3. semcards' slots (their number and types)
4. amount of content per slot (in bytes)
5. semcard owners (information stored in the semcard)
6. receivers (users who have been notified of matches)

The system can also provide statistics on higher-level phenomena like supply and demand trends for particular types of offers, requests and semcards, number of users with a particular interest profiles, number of potential matches for particular advertisements, and distribution of the user population along multiple dimensions. One method to achieve this last-mentioned option is to create a semcard describing the prototypical condition (average) for a particular trait. The marketing tool would generate multiple variations on this semcard using knowledge-based, iterative test-posts. The resulting semcard population would then provide actual statistics through multiple (hundreds, possibly thousands) of resulting matches, whose distribution describes the "semcard landscape" about the stubset of the network that the semcards would be targeted to when posted.

Standard information calculated includes aggregated statistics for all of these, e.g. total number of network matches for a given duration, where they occurred, as well as time-dynamics, demographic distributions, popularity ratings, response rates, etc.

In addition to bar charts, pie charts, tables and graphs, the semcard system provides users options to visualize the path and dynamics of a user's semcard plotting their path in concept space, demographic space, or geographic space, and ranking their popularity compared to other semcards in the network. This ranking assists other users in discovering particularly relevant semcards and helps those semcards reach larger audiences. Statistics for the whole network, any node, or sets thereof, can also be viewed in the system, depending on the node's access privileges. Statistics for many of the accounts, agencies and persons on the network can be browsed and searched via the semcard system. This is useful for community accounts, which may advertise their membership policies, member statistics and other information about their existence via semcards that can be browsed. It is also an important source of information for companies, enabling them to visualize what the employees are doing on their computers at the task and event-level—both providing a highly detailed resolution and high level of accuracy about what is actually happening. The high resolution of events and task recording afforded by the semcards enables one to see an accurate depiction of a whole organization at a glance, and then to "zoom in" to areas of interest, to the level of a division, a team, and all the way down to the level of an individual. This can be done both in time as well as in a large number of semantic dimensions.

The following is an example of how the present invention may be used.

1. Sue opens her semcard peer node application and logs in to her business account.
2. Sue opens a word processor and creates a text document called, "Marketing Plan".
3. Sue creates a semcard for the "Marketing Plan" document. She profiles it so that it can be seen by Phil, Lisa, and Dave, as well as by anyone in the "Marketing Team" group. Sue sets the semcard to include a copy of the "Marketing Plan" document rather than just a link to it.
4. Sue does some market research on the Web and finds two useful Web sites: "Industry Stats Central," and "Industry Report". The system automatically creates a Web Site semcard for each one.
5. Sue browses her local semcard space for "biotechnology market research" semcards. The results are 60 matching semcards.
6. Sue selects semcards for two more documents, "Biotech Industry Report," and "Biotech Industry Market Projections," from the search results and uses these semcards to create a new Collection semcard called, "Biotech Market Research" that includes them both. She then links the semcards "Industry Stats Central" and "Industry Report" to it as well.
7. The semcards in a collection inherit a link to that Collection, so from any semcard, Sue can see what, if any, Collections it is in and navigate to those collections to see what other items are related to it and then navigate to them.
8. Sue creates a Topic semcard called "Market Research" and links this Topic semcard to other existing Topic semcards for "Marketing," "Advertising, "Strategy," "Research," "Project X," and "Product Development." Each of these Topics now has a link to the "Market Research" Topic semcard as well. Sue can navigate around the resulting semcard map in various ways, by browsing, filtering, querying, and visualizing
9. Sue adds the "Market Research" Topic semcard to the "Biotech Market Research" Collection semcard. All of the semcards in the collection are now linked to this Topic. The Topic also is linked to the items in this collection. Now from the Market Research Topic semcard Sue can find related documents and topics, and vice-versa.
10. Sue creates a Collection semcard called "Biotech Marketing Resources" and includes the semcards for "Marketing Plan," "Biotech Market Research" Collection semcard.
11. Sue searches for Web Sites related to Biotech Market Research and finds "Industry Stats Central" and "Industry Report." She can see their metadata including their relations to other Semcards. She can navigate around her knowledge this way.
12. Sue wants to send the "Biotech Marketing Resources" semcard to her teammate, Phil. Sue uses the "Sharing" command on her client to allow Phil to access it.
13. Phil gets is notified, in his semcard peer application or in his email, that he has access to a new semcard from Sue called "Biotech Marketing Resources." Phil now has access to all the semcards that are linked to from that semcard, including any files that its semcards included.
14. Phil now searches his knowledge store for "Biotech Market Data" and finds 25 semcards. He links these 25 semcards to "Biotech Marketing Resources."
15. Phil shares his new links to the Biotech Marketing Resources semcard with Sue. He attaches also a note explaining what these new semcards are about.
16. Sue sees in her client that Phil has made links to her semcard and shared the with her.
17. Sue now shares her "Biotech Marketing Resources" semcard to anyone in the company who requests such resources, including Phil's newly linked semcards. The semcard is routed to the company's semcard server node, where it resides and is automatically queried and delivered to anyone in the company.
18. Sue now makes a Request semcard for "Market Research Consulting Services." She fills out the Service semcard, and posts it to selected departments within in the company. The Request semcard is routed to the corporate semcard server node. Sue receives matches to it as Offer semcards. She can then correspond with the matched parties, negotiate, share further semcards, schedule meetings or live web conferences, and hire a consultant etc.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, an application that doesn't use ontologies to define concepts can nontheless implement most of the features described in this disclosure. Applications focusing on particular vertical domains and markets, such as medicine, crime fighting, law, research, design, etc., can be built with specialized semcards, using subsets of features described here or obvious but domain-specific extensions to these. Furthermore, the semcard management application as described can be adopted to handle other semantically-rich entities besides semcards and others of those listed here. Accordingly, the present embodiments are to be considered as illustrative and not restrictive, and the invention is not to be limited to the details given herein, but may be modified within the scope and equivalents of the appended claims.

What we claim is:

1. A method of tracking a SEMCARD that is one of a plurality of SEMCARDS in a computing device, the method comprising:
    assigning an identifier to the SEMCARD that is one of the plurality of SEMCARDS in a computer storage element;
    in response to receiving an access request to access the SEMCARD, retrieving a set of meta-tags identifying a set of meta-data and storing it in a Relationship SEMCARD;
    wherein the set of meta-data, stored in the Relationship SEMCARD, includes one or more rules and policies governing permissions to access the SEMCARD residing in the computer storage element;
    responding to the access request based on the identified one or more rules and policies governing access permissions to the SEMCARD residing in the computer storage element; and
    storing, in a computer storage element, the access request to access the SEMCARD.

2. The method of claim 1, wherein the SEMCARD is associated with a creator user and wherein the one or more rules and policies governing access permission are specifiable by the creator user.

3. The method of claim 2, wherein the access request is generated by one or more of the creator user and a second user.

4. The method of claim 3, wherein the access request comprises a share request generated by one or more of the creator user and the second user.

5. The method of claim 3, wherein the access request comprises one or more of a view, edit, store, and comment request generated by the second user.

6. The method of claim 1, wherein the set of meta-data, stored in a Relationship SEMCARD, includes one or more display rules and policies governing display properties of the SEMCARD.

7. The method of claim 1, further comprising determining statistical attributes associated with records of a plurality of access requests of a set of SEMCARDS of the plurality of SEMCARDS.

8. The method of claim 7, further comprising, deducing one or more of supply and demand trends based on the statistical attributes associated with records of the plurality of access requests for the set of SEMCARDS.

9. A method of managing a SEMCARD collection in a computing device, the method comprising:
    receiving a request to create the SEMCARD collection in a computer storage element comprising a set of SEMCARDS;
    creating a semantic link between the set of SEMCARDS via updating metadata in a Linking SEMCARD associated with the set of SEMCARDS;
    identifying a set of rules and policies to be associated with the SEMCARD collection residing in a computer storage element; and
    updating the metadata in a Relationship SEMCARD, associated with the set of SEMCARDS based on the set of rules and policies;
    and governing access to the SEMCARDS based on the metadata updated in the Relationship SEMCARD.

10. The method of claim 9, further comprising, semantically linking the SEMCARD collection to one or more topics, responsive to receiving a request via a Linking SEMCARD.

11. The method of claim 10, further comprising, automatically semantically linking the set of SEMCARDS to another set of SEMCARDS associated with the one or more topics via a Linking SEMCARD.

12. The method of claim 9, further comprising, presenting a visual indication of the semantic link when one or more SEMCARDS of the set of SEMCARDS are accessed.

13. The method of claim 12, wherein the accessing comprises one or more of, sharing, browsing, filtering, querying, and viewing the SEMCARD.

14. The method of claim 9, wherein the request to create the SEMCARD collection is generated by a creator user.

15. The method of claim 14, wherein the set of rules and policies to be associated with the SEMCARD collection is determined by the creator user.

16. The method of claim 15, further comprising, providing a second user with access to a shared SEMCARD of the set of SEMCARDS of the SEMCARD collection responsive to a share request generated by the creator user.

17. The method of claim 16, further comprising, presenting to the second user, a visual indication of the semantic links between the shared SEMCARD and the set of SEMCARDS of the SEMCARD collection.

18. The method of claim 17, further comprising:
    receiving link request from the second user, to link a second set of SEMCARDS to the SEMCARD collection via a Linking SEMCARD;
    identifying a set of access permission rules and policies of a set of rules and policies governing the SEMCARD collection from metadata, stored in a Relationship SEMCARD, associated with the SEMCARD collection; and
    determining an action towards the link request based on user metadata of the second user and the set of access permission rules and policies.

19. The method of claim 18, further comprising, creating semantic links between the second set of SEMCARDS and the set of SEMCARDS when in compliance with the set of access permission rules and policies, via a Linking SEMCARD.

20. A system in a computing device, comprising:
    a database in a computer storage element, to store one or more of a set of user metadata associated with a set of users, a set of group metadata associated with a set of user groups, and a set of metadata, stored in a Relationship SEMCARD, associated with a set of SEMCARDS;

an identity module communicatively coupled to the database, when, in operation, communicates with the database to retrieve the set of user metadata and the set of group metadata, all stored in a Relationship SEMCARD, for management;

an automations module for tracking and enforcing a set of rules and policies associated with the set of SEMCARDS;

wherein the set of rules and policies associated with the set of SEMCARDS comprise a set of accessibility rules and policies of one or more of the set of SEMCARDS by a user of the set of users;

the automations module, when, in operation, communicates with the identity module to determine an accessibility rule of the set of accessibility rules and policies based on user metadata of the user and metadata of the one or more of the set of SEMCARDS;

a network module, when, in operation, communicates with one or more of, one or more of the set of users, a web page, a network, and a server;

a user interface module, when, in operation, presents a user interface to the user for the user to submit a query; and a relationship module communicatively coupled to the identity module to manage relationships between the set of users based on the set of user metadata in the computer storage element.

21. The system of claim 20, further comprising, a match module communicatively coupled to the database, when, in operation, determines a conceptual distance between a first SEMCARD and a second SEMCARD of the set of SEMCARDS.

* * * * *